United States Patent
Nomura

(10) Patent No.: US 9,557,539 B2
(45) Date of Patent: Jan. 31, 2017

(54) FIXED FOCAL-LENGTH LENS SYSTEM

(71) Applicant: RICOH IMAGING COMPANY, LTD., Tokyo (JP)

(72) Inventor: Yoichi Nomura, Saitama (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 14/893,246

(22) PCT Filed: May 1, 2014

(86) PCT No.: PCT/JP2014/062072
§ 371 (c)(1),
(2) Date: Nov. 23, 2015

(87) PCT Pub. No.: WO2014/203631
PCT Pub. Date: Dec. 24, 2014

(65) Prior Publication Data
US 2016/0131878 A1  May 12, 2016

(30) Foreign Application Priority Data

Jun. 19, 2013 (JP) ................................. 2013-128436

(51) Int. Cl.
*G02B 9/00* (2006.01)
*G02B 13/24* (2006.01)
(Continued)

(52) U.S. Cl.
CPC ............... *G02B 13/24* (2013.01); *G02B 5/005* (2013.01); *G02B 9/64* (2013.01); *G02B 13/005* (2013.01);
(Continued)

(58) Field of Classification Search
CPC .................................................... G02B 13/24
(Continued)

(56) References Cited

U.S. PATENT DOCUMENTS 4,708,445 A    11/1987 Goto
4,923,292 A     5/1990 Matsuo
(Continued)

FOREIGN PATENT DOCUMENTS

JP    60-100115    6/1985
JP    1-214812     8/1989
(Continued)

OTHER PUBLICATIONS

International Search Report, with English-language translation thereof, for PCT/JP2014/062072 having an issuance date of Jul. 8, 2014.

(Continued)

*Primary Examiner* — James Jones
(74) *Attorney, Agent, or Firm* — Greenblum & Bernstein, P.L.C.

(57) ABSTRACT

A fixed focal-length lens system includes a negative first lens group, a positive second and third lens groups. The first and second lens groups move toward the object side during focusing from an object at infinity to an object at a close-up distance. The first lens group includes a negative lens element having a concave surface on the image side, at least two positive lens elements, and a negative lens element having a concave surface on the image side. The second lens group includes a negative lens element having a concave surface on the object side, and at least two positive lens elements. The third lens group includes at least one negative lens element, and at least one positive lens element. The following condition (1) is satisfied:

$$-0.3 < fG2/fG1 < -0.05 \quad (1),$$

wherein fG1 and fG2 designate the focal lengths of the first and second lens groups.

15 Claims, 26 Drawing Sheets

(51) Int. Cl.
  *G02B 5/00* (2006.01)
  *G02B 9/64* (2006.01)
  *G02B 13/00* (2006.01)
  *G02B 13/02* (2006.01)
  *G02B 27/00* (2006.01)
  *G02B 13/04* (2006.01)

(52) U.S. Cl.
  CPC ............ *G02B 13/006* (2013.01); *G02B 13/02* (2013.01); *G02B 13/04* (2013.01); *G02B 27/0025* (2013.01)

(58) Field of Classification Search
  USPC ........................................................ 359/740
  See application file for complete search history.

(56) References Cited

U.S. PATENT DOCUMENTS

| | | | |
|---|---|---|---|
| 5,257,137 A | 10/1993 | Suzuki et al. | |
| 5,623,371 A | 4/1997 | Hankawa | |
| 2003/0103269 A1 | 6/2003 | Takato | |
| 2005/0141102 A1 | 6/2005 | Arakawa | |
| 2009/0153980 A1 | 6/2009 | Yamamoto | |
| 2011/0170195 A1 | 7/2011 | Muratani et al. | |
| 2012/0229912 A1* | 9/2012 | Abe | G02B 15/177 359/680 |

FOREIGN PATENT DOCUMENTS

| | | |
|---|---|---|
| JP | 4-304408 | 10/1992 |
| JP | 6-130291 | 5/1994 |
| JP | 8-15609 | 1/1996 |
| JP | 3429562 | 5/2003 |
| JP | 2003-161877 | 6/2003 |
| JP | 2004-212692 | 7/2004 |
| JP | 2005-189727 | 7/2005 |
| JP | 2008-20656 | 1/2008 |
| JP | 2008-191672 | 8/2008 |
| JP | 2008-298840 | 12/2008 |
| JP | 2009-145587 | 7/2009 |
| JP | 2011-107313 | 6/2011 |
| JP | 2011-145436 | 7/2011 |
| JP | 2012-88619 | 5/2012 |
| JP | 4986710 | 5/2012 |
| JP | 4996151 | 5/2012 |

OTHER PUBLICATIONS

Written Opinion of the International Searching Authority, with English-language translation thereof, for PCT/JP2014/062072 having an issuance date of Jul. 8, 2014.

* cited by examiner

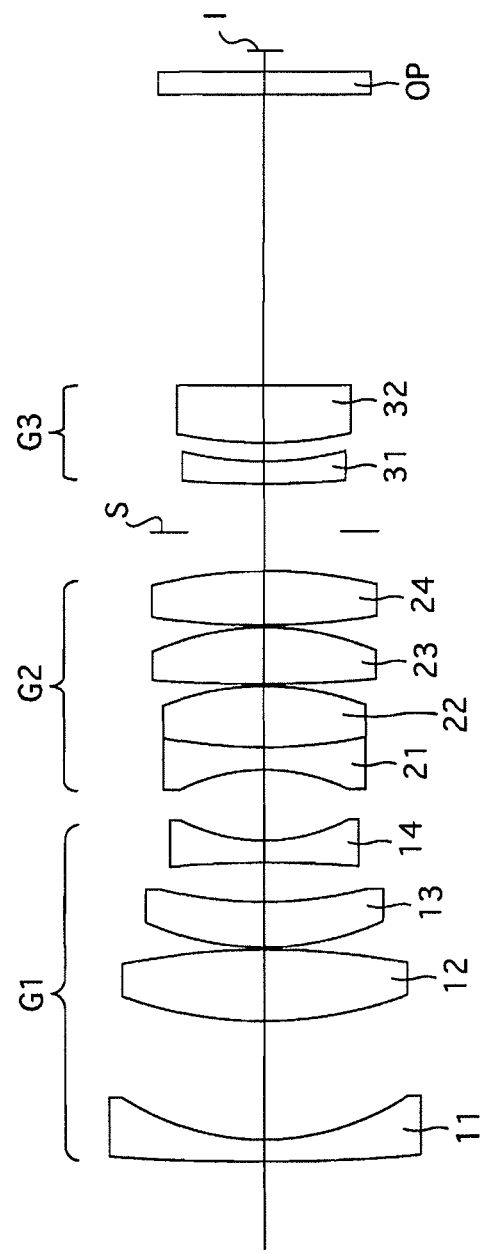

FNO.=1:2.8

—— d Line
------- g Line
---- C Line

-0.02  0.02
SPHERICAL
ABERRATION
CHROMATIC
ABERRATION

W=15.8

-0.005  0.005
LATERAL
CHROMATIC
ABERRATION

W=15.8

—— S
-- M

-0.02  0.02
ASTIGMATISM

W=15.8

-5.0  5.0 %
DISTORTION

Y= 0.00    +0.02
           -0.02

Y= 2.82    +0.02
           -0.02

Y= 3.29    +0.02
           -0.02

Y= 5.00    +0.02
           -0.02

—— d Line
------- g Line
---- C Line

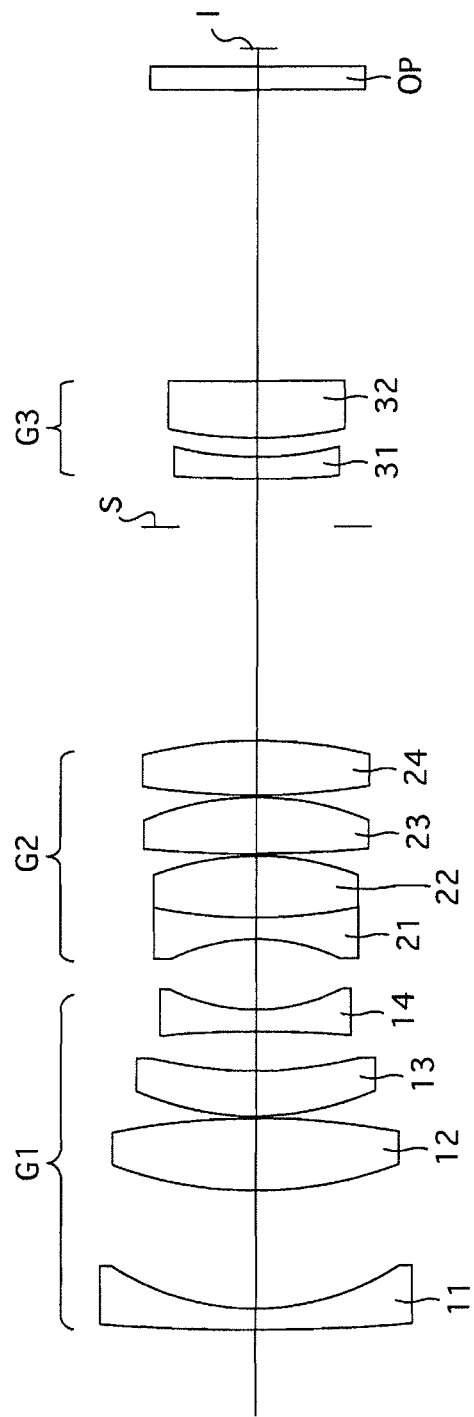

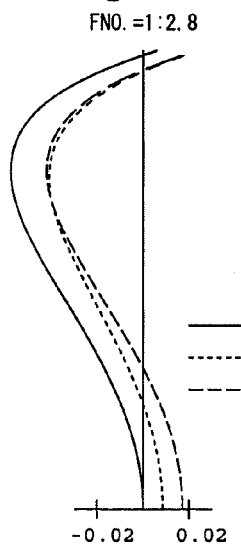
Fig. 5A
FNO.=1:2.8
—— d Line
------- g Line
---- C Line
-0.02  0.02
SPHERICAL
ABERRATION
CHROMATIC
ABERRATION
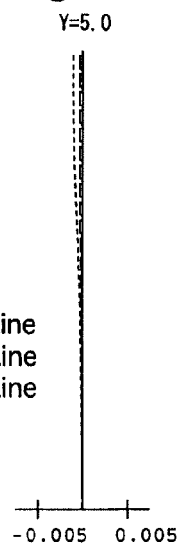
Fig. 5B
Y=5.0
-0.005  0.005
LATERAL
CHROMATIC
ABERRATION
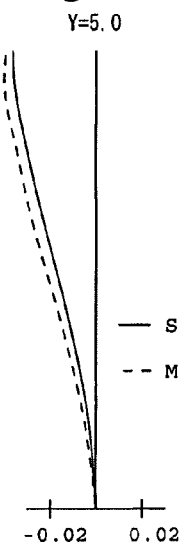
Fig. 5C
Y=5.0
— S
-- M
-0.02  0.02
ASTIGMATISM
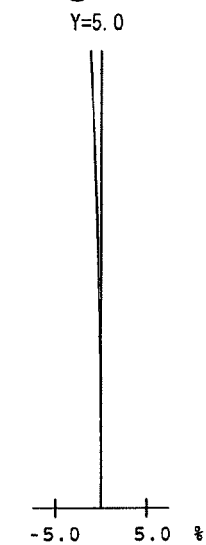
Fig. 5D
Y=5.0
-5.0  5.0 %
DISTORTION
Fig. 6A
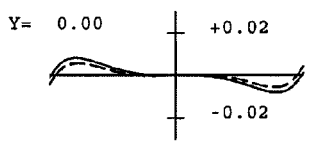
Y= 0.00   +0.02 / -0.02
Fig. 6B
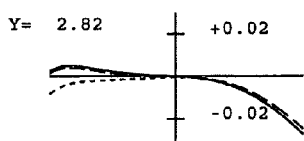
Y= 2.82   +0.02 / -0.02
Fig. 6C
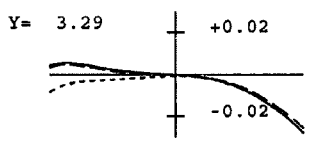
Y= 3.29   +0.02 / -0.02
Fig. 6D
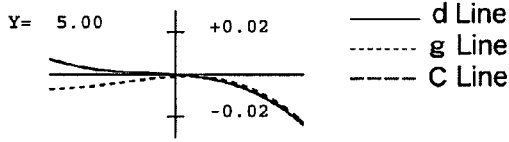
Y= 5.00   +0.02 / -0.02
—— d Line
------- g Line
---- C Line

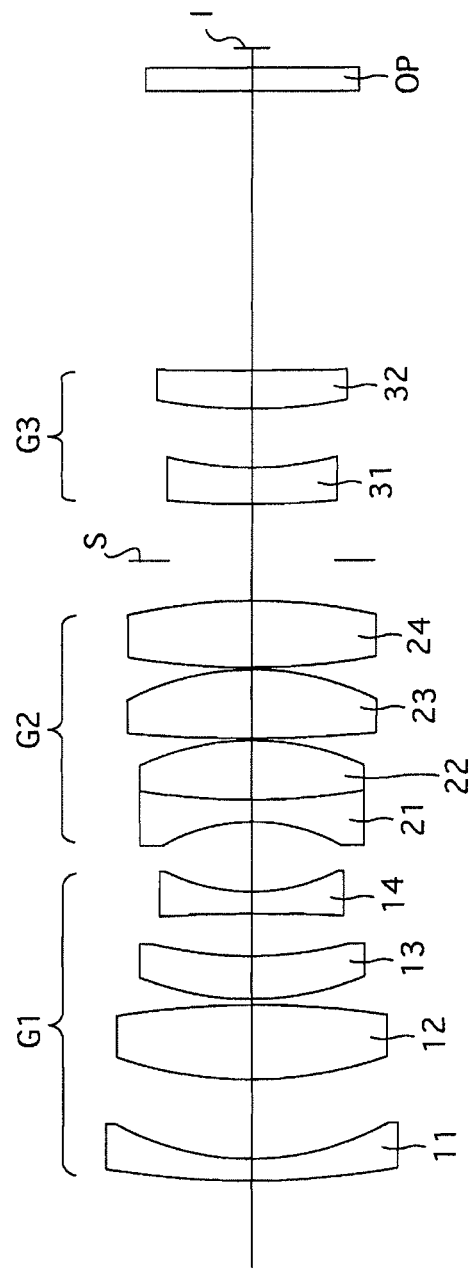

SPHERICAL ABERRATION CHROMATIC ABERRATION   LATERAL CHROMATIC ABERRATION   ASTIGMATISM   DISTORTION

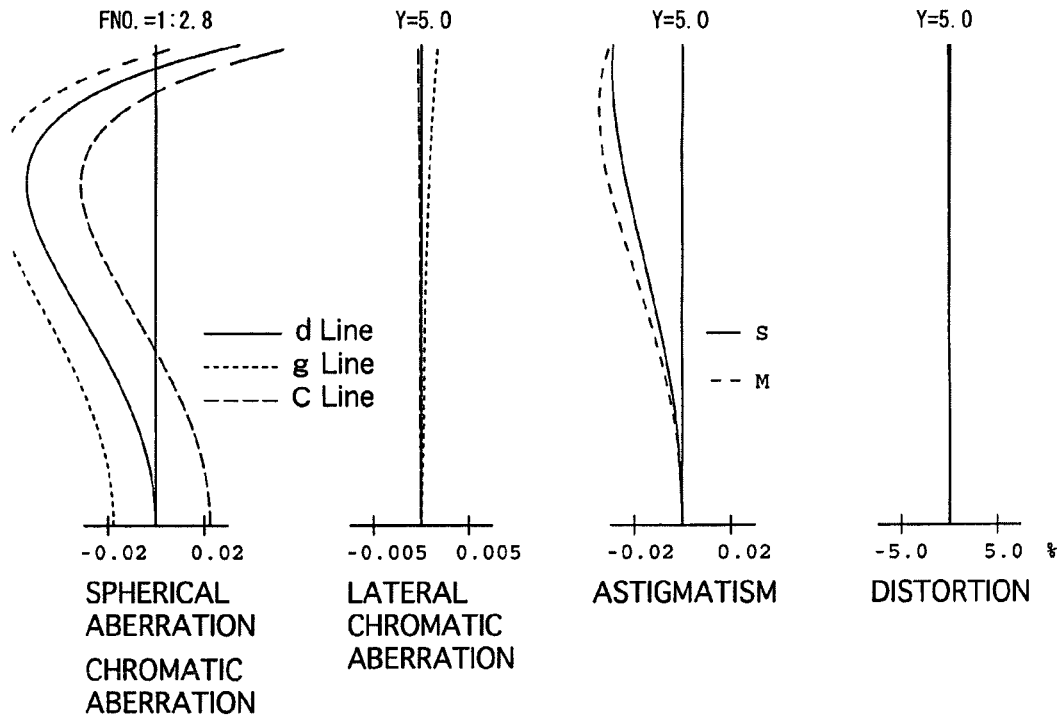

SPHERICAL ABERRATION CHROMATIC ABERRATION — LATERAL CHROMATIC ABERRATION — ASTIGMATISM — DISTORTION

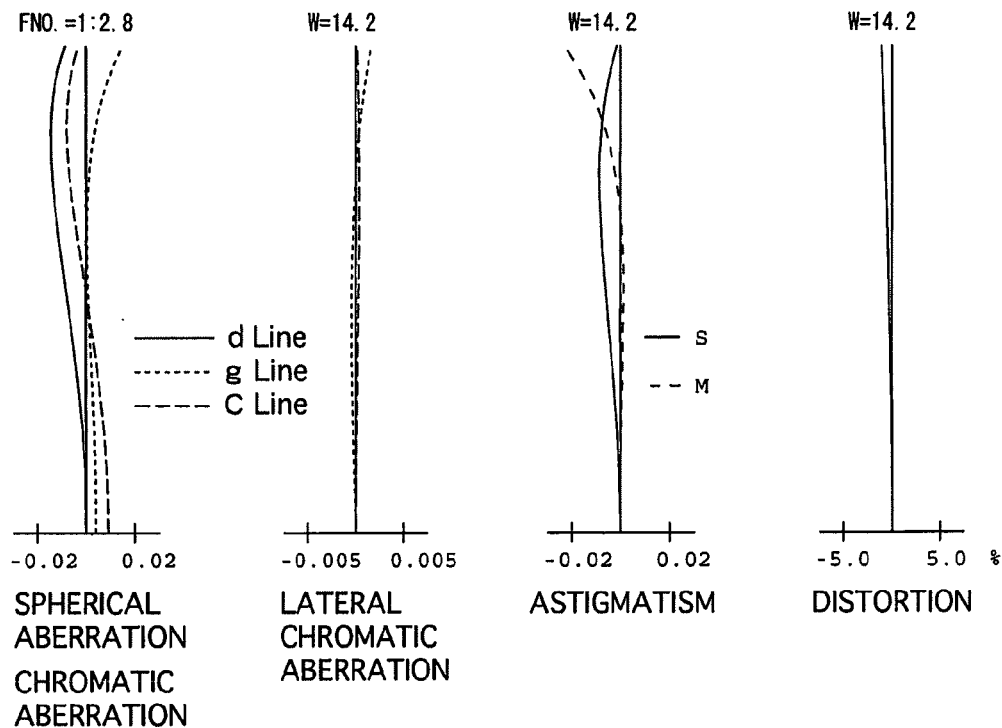
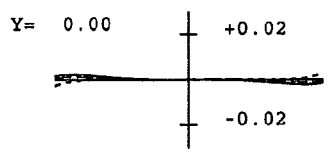
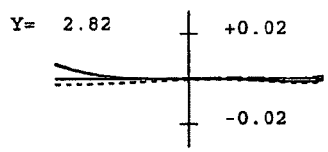
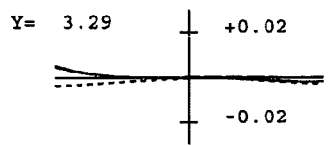
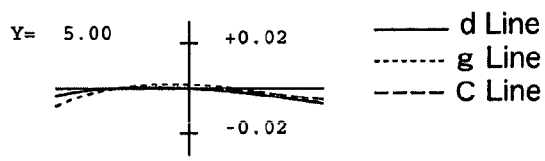

SPHERICAL ABERRATION CHROMATIC ABERRATION · LATERAL CHROMATIC ABERRATION · ASTIGMATISM · DISTORTION

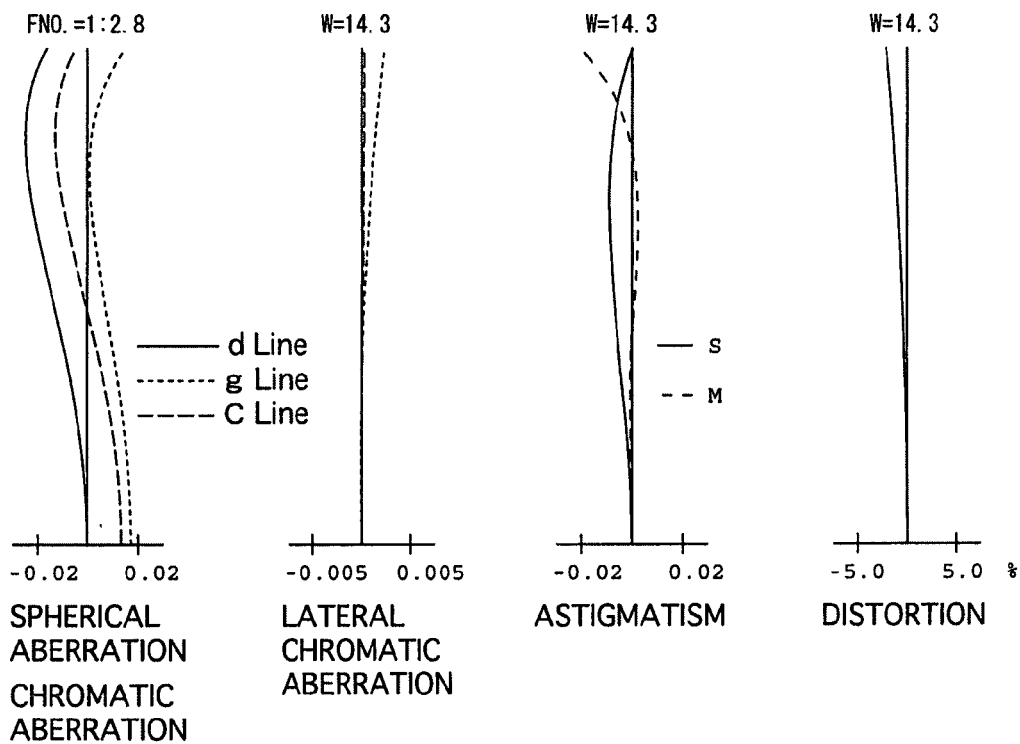
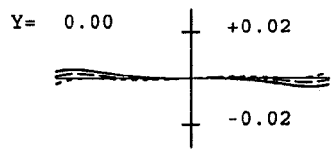
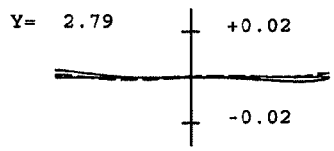
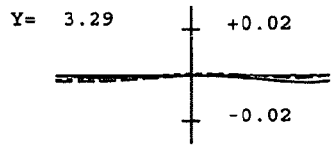
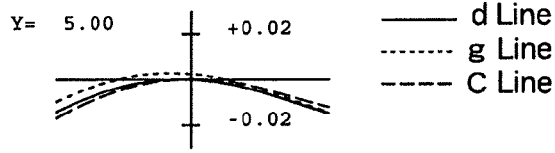

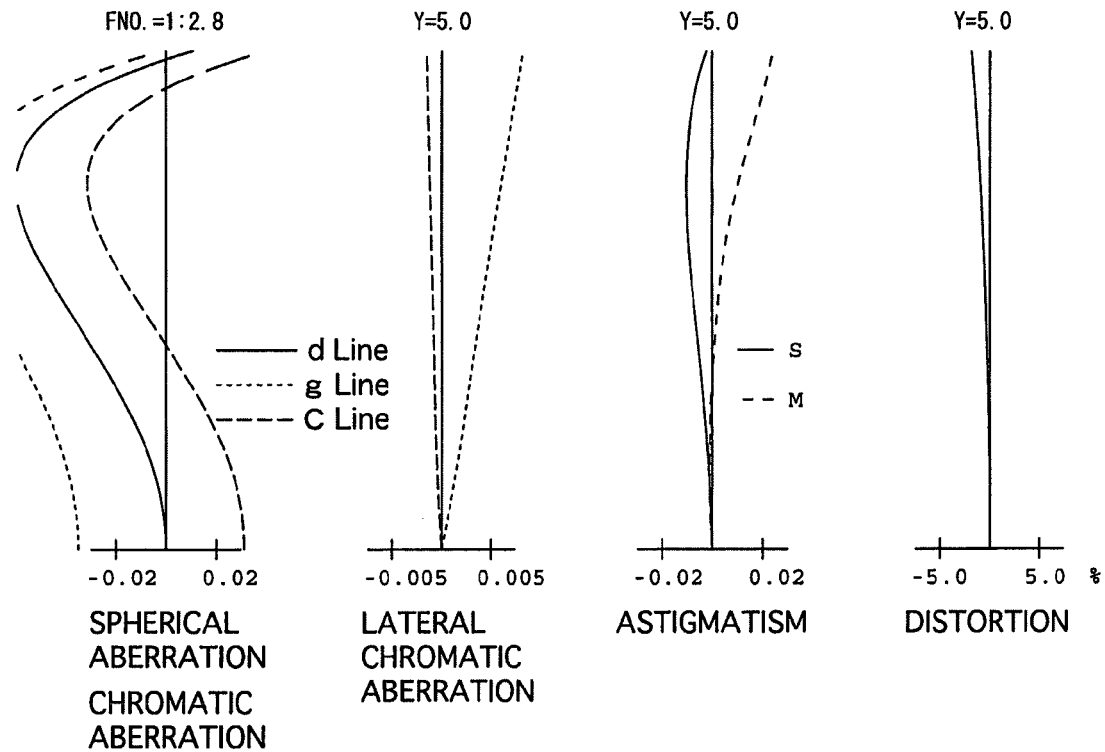
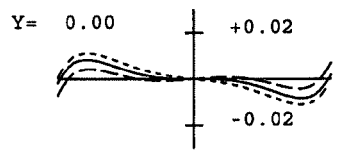
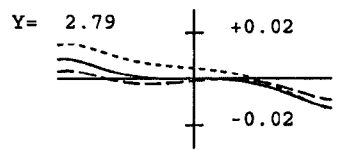
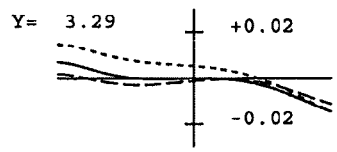
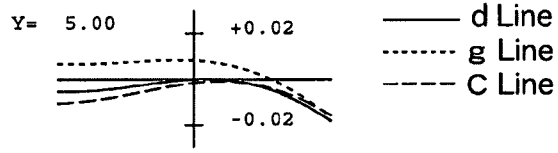

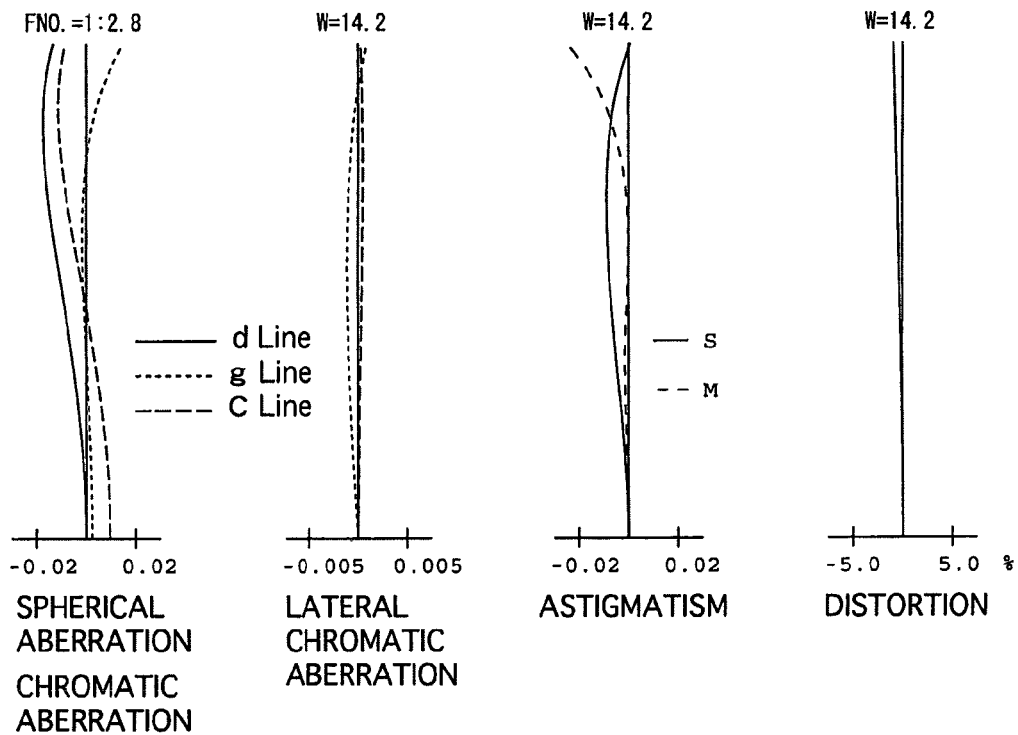
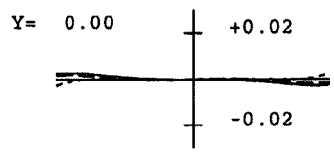
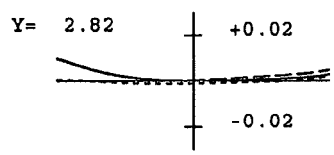
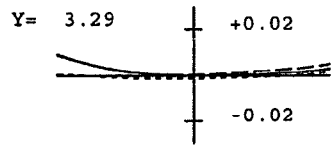
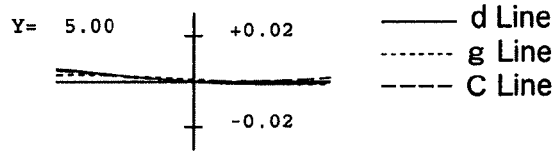

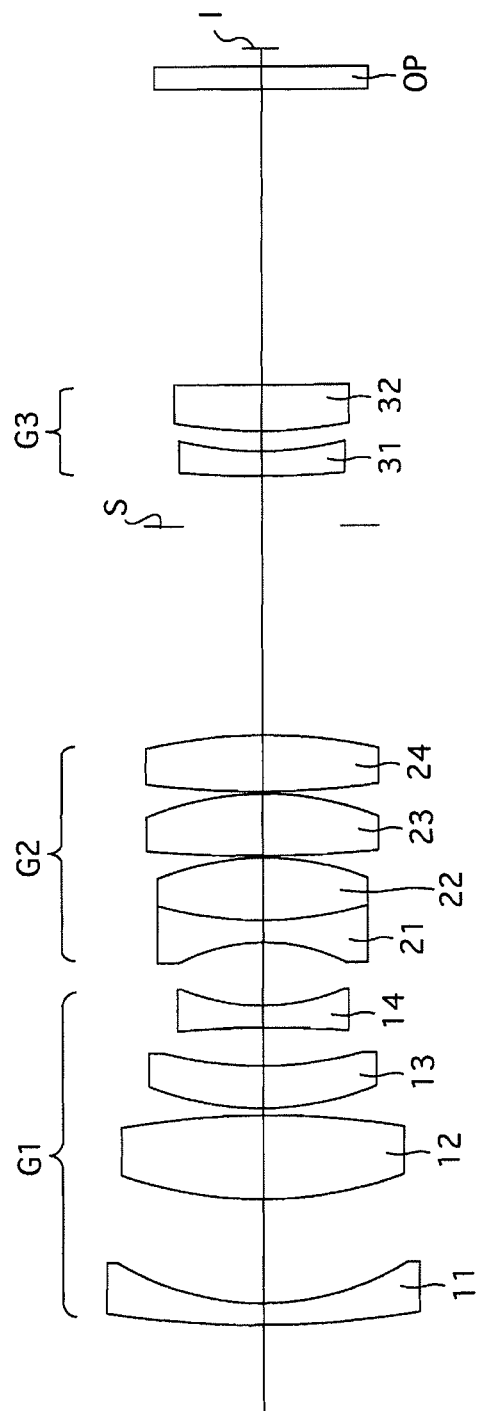

SPHERICAL ABERRATION CHROMATIC ABERRATION

LATERAL CHROMATIC ABERRATION

ASTIGMATISM

DISTORTION

FIXED FOCAL-LENGTH LENS SYSTEM

TECHNICAL FIELD

The present invention relates to a fixed focal-length lens system, which is capable of macro photography and includes an intermediate telephoto angle-of-view.

BACKGROUND ART

Conventionally, a typical low-magnification photographing lens system which is not specifically designed for macro photography (close-up photography) can be used as a macro lens system by advancing the entire lens system to focus on an object at a short distance to obtain an in-focus paraxial object image, however, the optical quality is insufficient due to a large amount of aberration fluctuations occurring during close-up photography compared to when focusing on an object at infinity. Accordingly, in order to maintain a favorable optical quality for a photographing distance ranging from infinity through to a close-up distance, a macro lens system has been proposed that employs a so-called "floating method", in which focusing is performed by moving a plurality of lens groups by differing amounts to suppress aberration fluctuations that occur during close-up photography.

Patent Literature Nos. 1 through 4 each disclose a macro lens system which employs a floating method. In order to achieve a lens system that employs a floating method in a photographing apparatus, in which a further miniaturized image sensor is installed, in theory it is only necessary to scale down each numerical embodiment of the macro lens systems of Patent Literature Nos. 1 through 4. However, when such a scaled-down model is adjusted to lens element thicknesses and distances between lens elements that are determined with consideration of workability and assemblability, the balance of aberration corrections is lost, so that various aberrations increase and the optical quality becomes insufficient.

In each macro lens system of Patent Literature Nos. 1 through 4, an aperture diaphragm is included within a focusing lens group, which moves during focusing. Therefore, when the macro lens system of each of Patent Literature Nos. 1 through 4 is applied to an interchangeable lens, in which a shutter unit is mounted within the lens body, that is typified by a non-reflex camera (mirrorless camera), the shutter unit must be moved with the lens body during focusing, unavoidably complicating and enlarging the floating mechanism. Furthermore, since motors or actuators are required to cater to the number and weight of the focusing lens group(s), the lens system that includes a lens barrel increases in size.

CITATION LIST

Patent Literature

Patent Literature 1: Japanese Patent No. 4,996,151
Patent Literature 2: Japanese Patent No. 4,986,710
Patent Literature 3: Japanese Patent No. 3,429,562
Patent Literature 4: Japanese Unexamined Patent Publication No. 2009-145587

SUMMARY OF THE INVENTION

Technical Problem

The present invention has been devised with consideration of the aforementioned problems, and an object of the present invention is to achieve a fixed focal-length lens system which is ideal for an interchangeable lens, in which a shutter unit is mounted within the lens body, that is typified by a non-reflex camera (mirrorless camera), includes an intermediate telephoto angle-of-view, has a simple and miniaturized focusing mechanism, the entire lens system is compact, can achieve a superior optical quality by favorably correct various aberrations, and is capable of macro photography.

Solution to Problem

A fixed focal-length lens system is provided, including a negative first lens group, a positive second lens group and a positive third lens group, in that order from the object side, wherein the first lens group and the second lens group move toward the object side during focusing from an object at infinity to an object at a close-up distance. The first lens group includes a negative lens element having a concave surface on the image side, at least two positive lens elements, and a negative lens element having a concave surface on the image side, in that order from a side closest to the object to a side closest to the image. The second lens group includes a negative lens element having a concave surface on the object side, and at least two positive lens elements, in that order from the object side. The third lens group includes at least one negative lens element, and at least one positive lens element. The following condition (1) is satisfied:

$$-0.3 < fG2/fG1 < -0.05 \quad (1),$$

wherein fG1 designates the focal length of the first lens group, and fG2 designates the focal length of the second lens group.

The second lens group can be configured of a negative cemented lens, and at least one positive lens element, in that order from the object side.

The second lens group can be configured of a negative cemented lens, and at least two positive lens elements, in that order from the object side.

The cemented lens that is provided within the second lens group can be configured of a negative lens element and a positive lens element, in that order from the object side.

It is desirable for the following conditions (2) and (3) to be satisfied:

$$nd(G2N) < 1.82 \quad (2)$$

and $$vd(G2N) < 50 \quad (3),$$

wherein nd(G2N) designates the refractive index at the d-line of the negative lens element that is provided closest to the object side within the second lens group, and vd(G2N) designates the Abbe number at the d-line of the negative lens element that is provided closest to the object side within the second lens group.

It is desirable for the following condition (4) to be satisfied:

$$\Delta Pg, F(G2N) < 0 \quad (4),$$

wherein $\Delta Pg, F(G2N)$ designates the anomalous dispersion of the negative lens element that is provided closest to the object side within the second lens group, wherein (A) $\Delta Pg, F = 0.002vd - 0.6575 + Pg,F$: anomalous dispersion between the g-line and the F-line, and wherein (B) $Pg, F = (N_g - N_F)/(N_F - N_C)$: partial dispersion ratio between the g-line and the F-line.

It is desirable for the following condition (5) to be satisfied:

$$vd(G2P) > 80 \qquad (5),$$

wherein vd(G2P) designates the Abbe number at the d-line of at least one positive lens element of the positive lens elements provided within the second lens group.

It is desirable for the fixed focal-length lens system of the present invention to satisfy the following condition (5') from within the range of condition (5):

$$vd(G2P) > 90 \qquad (5').$$

The first lens group can be configured of a negative lens element having a concave surface on the image side, a positive lens element having a convex surface on the object side, a positive meniscus lens element having a concave surface on the image side, and a negative lens element having a concave surface on the image side, in that order from the object side.

In the fixed focal-length lens system of the present invention, it is desirable for the following conditions (6) and (7) to be satisfied:

$$nd(G1P) > 1.70 \qquad (6),$$

and $$vd(G1P) > 45 \qquad (7),$$

wherein nd(G1P) designates the refractive index at the d-line of at least one positive lens element of the positive lens elements provided within the first lens group, and vd(G1P) designates the Abbe number at the d-line of at least one positive lens element of the positive lens elements provided within the first lens group.

It is desirable for the following conditions (8) and (9) to be satisfied:

$$0.5 < SF(L1) < 3 \qquad (8),$$

and $$vd(L1) > 50 \qquad (9),$$

wherein SF(L1) designates the shaping factor of the negative lens element provided closest to the object side within the first lens group, SF(L1)=(L1R1+L1R2)/(L1R1−L1R2); L1R1 designates the radius of curvature of the surface on the object side of the negative lens element provided closest to the object side within the first lens group, L1R2 designates the radius of curvature of the surface on the image side of the negative lens element provided closest to the object side within the first lens group, and vd(L1) designates the Abbe number at the d-line of the negative lens element provided closest to the object side within the first lens group.

It is desirable for the following condition (10) to be satisfied:

$$\Delta Pg, F(G1N) < 0 \qquad (10),$$

wherein ΔPg, F(G1N) designates the anomalous dispersion of the negative lens element that is provided closest to the image side within the first lens group, wherein (A) ΔPg, F=0.002vd−0.6575+Pg,F: anomalous dispersion between the g-line and the F-line, and wherein (B) Pg, F=($N_g$−$N_F$)/($N_F$−$N_C$): partial dispersion ratio between the g-line and the F-line.

In the fixed focal-length lens system of the present invention, an aperture diaphragm can be positioned between the second lens group and the third lens group, wherein the aperture diaphragm remains stationary, with the third lens group, relative to the imaging plane during focusing from an object at infinity to an object at a close-up distance.

Alternatively, an aperture diaphragm can be positioned between the first lens group and the second lens group, wherein the aperture diaphragm integrally moves toward the object side with the first lens group and the second lens group during focusing from an object at infinity to an object at a close-up distance.

A fixed focal-length lens system of the present invention, in another embodiment, is configured of a negative first lens group, a positive second lens group and a positive third lens group, in that order from the object side. The first lens group includes four lens elements: a negative lens element, a positive lens element, a positive lens element and a negative lens element, in that order from the object side. The second lens group includes three lens elements: a negative lens element, a positive lens element and a positive lens element, in that order from the object side; or four lens elements: a negative lens element, a positive lens element, a positive lens element and a positive lens element, in that order from the object side. The third lens group includes two lens elements: a negative lens element and a positive lens element, in that order from the object side. An aperture diaphragm is positioned between the second lens group and the third lens group. During focusing from an object at infinity to an object at a close-up distance, the first lens group and the second lens group move toward the object side, and the aperture diaphragm remains stationary, with the third lens group, relative to the imaging plane.

Advantageous Effects of Invention

According to the present invention, a fixed focal-length lens system can be achieved which is ideal for an interchangeable lens, in which a shutter unit is mounted within the lens body, that is typified by a non-reflex camera (mirrorless camera), includes an intermediate telephoto angle-of-view, has a simple and miniaturized focusing mechanism, the entire lens system being compact, can achieve a superior optical quality by favorably correct various aberrations, and is capable of macro photography.

BRIEF DESCRIPTION OF DRAWINGS

FIG. 1 shows a lens arrangement of a first numerical embodiment of a fixed focal-length lens system, according to the present invention, at an infinite photographic position;

FIG. 4 shows a lens arrangement of a first numerical embodiment of a fixed focal-length lens system, according to the present invention, at a minimum photographic position;

FIGS. 5A, 5b, 5C, and 5D show various aberrations that occurred in the arrangement of FIG. 4;

FIGS. 6A, 6B, 6C, and 6D show lateral aberrations that occurred in the arrangement of FIG. 4;

FIG. 7 shows a lens arrangement of a second numerical embodiment of a fixed focal-length lens system, according to the present invention, at an infinite photographic position;

FIGS. 11A, 11B, 11C, and 11D show various aberrations that occurred in the arrangement of FIG. 10;

FIGS. 12A, 12B, 12C, and 12D show lateral aberrations that occurred in the arrangement of FIG. 10;

FIGS. 20A, 20B, 20C, and 20D show various aberrations that occurred in the arrangement of FIG. 19;

FIGS. 21A, 21B, 21C, and 21D show lateral aberrations that occurred in the arrangement of FIG. 19;

FIGS. 26A, 26B, 26C, and 26D show various aberrations that occurred in the arrangement of FIG. 25;

FIGS. 27A, 27B, 27C, and 27D show lateral aberrations that occurred in the arrangement of FIG. 25;

FIGS. 29A, 29B, 29C, and 29D show various aberrations that occurred in the arrangement of FIG. 28;

FIGS. 30A, 30B, 30C, and 30D show lateral aberrations that occurred in the arrangement of FIG. 28;

FIGS. 32A, 32B, 32C, and 32D show various aberrations that occurred in the arrangement of FIG. 31;

FIGS. 33A, 33B, 33C, and 33D show lateral aberrations that occurred in the arrangement of FIG. 31;

FIG. 34 shows a lens arrangement of a sixth numerical embodiment of a fixed focal-length lens system, according to the present invention, at a minimum photographic position;

DESCRIPTION OF EMBODIMENTS

Figure 37:
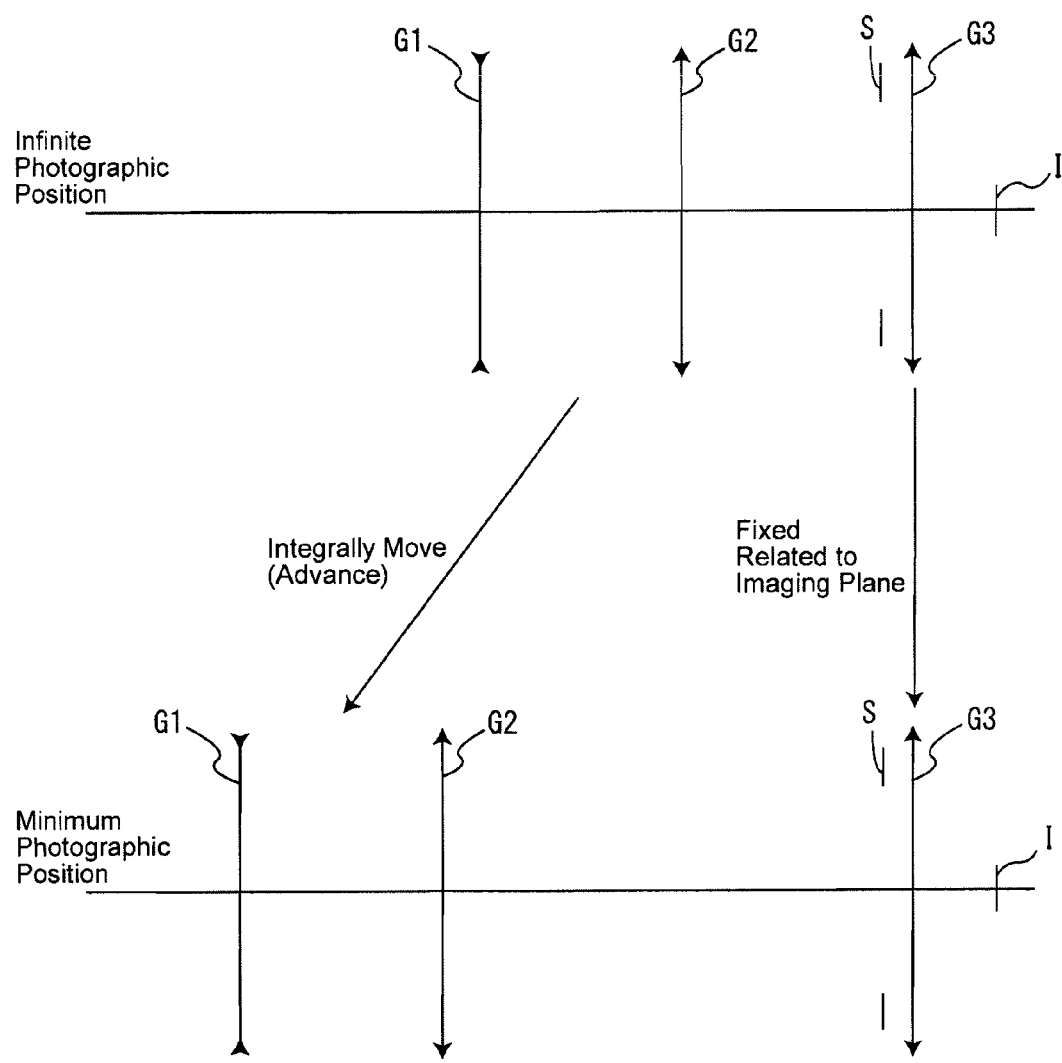
FIG. 37 shows a first simplified movement diagram of the fixed focal-length lens system according to the present invention when focusing from the infinite photographic position to the minimum photographic position.
Figure 38:
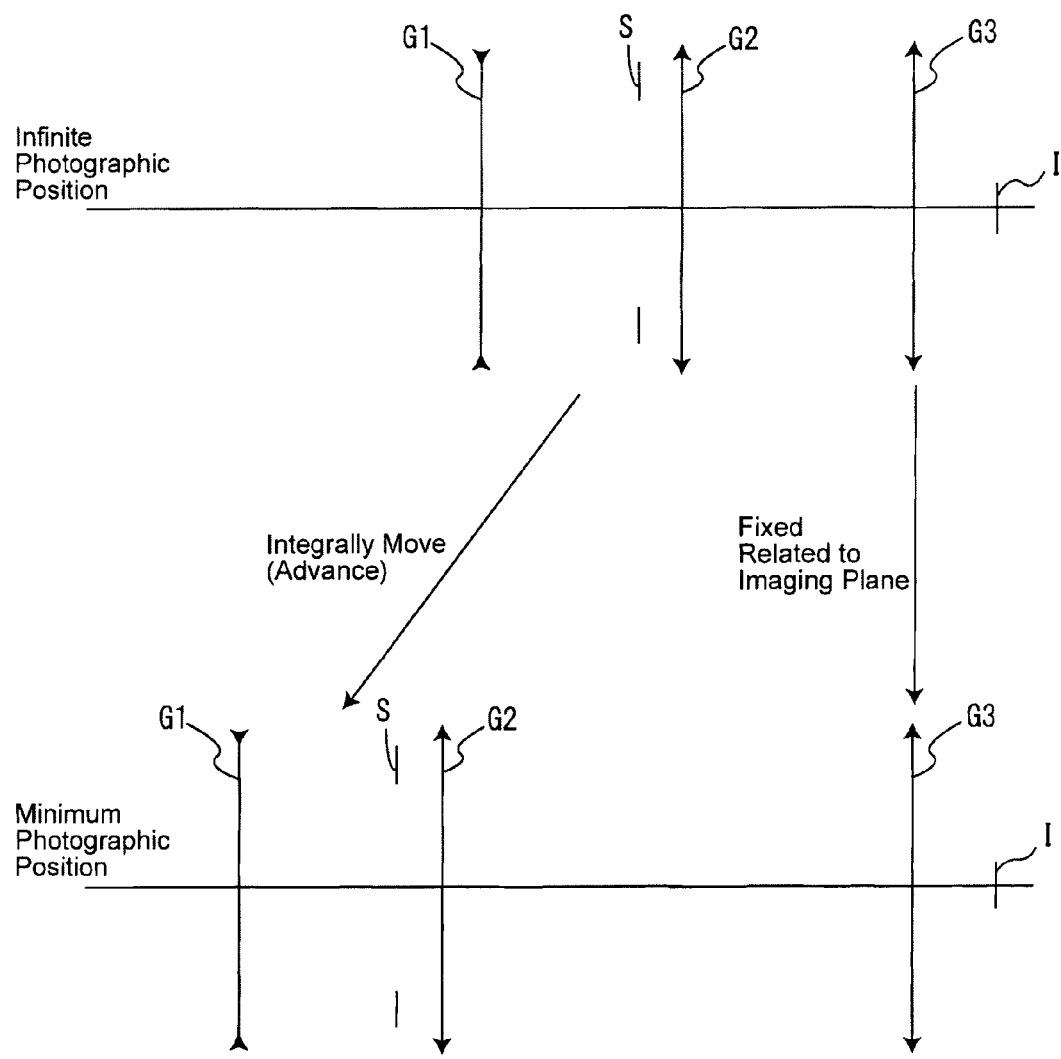
FIG. 38 shows a second simplified movement diagram of the fixed focal-length lens system according to the present invention when focusing from the infinite photographic position to the minimum photographic position.

As shown in the simplified movement diagrams of FIGS. 37 and 38, in each of the first through sixth numerical embodiments, the fixed focal-length lens systems of the present embodiments are configured of a negative first lens group G1, a positive second lens group G2 and a positive third lens group G3, in that order from the object side. 'I' designates an imaging plane.

In each of the first, second, fourth through sixth numerical embodiments, in the fixed focal-length lens system of the present embodiments, an aperture diaphragm S is positioned in between the second lens group G2 and the third lens group G3, as shown in the simplified movement diagram of FIG. 37. During focusing from an object at infinity to an object at a close-up distance, the first lens group G1 and the second lens group G2 move (advance) toward the object side, and the aperture diaphragm S remains stationary, with the third lens group G3, relative to the imaging plane I.

In the third numerical embodiment, in the fixed focal-length lens system of the present embodiment, an aperture diaphragm S is positioned in between the first lens group G1 and the second lens group G2, as shown in the simplified movement diagram of FIG. 38. During focusing from an object at infinity to an object at a close-up distance, the aperture diaphragm S moves (advances) integrally with the first lens group G1 and the second lens group G2 toward the object side, and the third lens group G3 remains stationary relative to the imaging plane I.

Furthermore, an embodiment is possible in which, during focusing from an object at infinity to an object at a close-up distance, the third lens group G3 moves (advances) toward the object side. In addition, an embodiment is possible in which, during focusing from an object at infinity to an object at a close-up distance, the aperture diaphragm S moves in the optical axis direction independently from the first through third lens groups G1 through G3.

In each of the first through sixth numerical embodiments, the first lens group G1 is configured of a negative meniscus lens element 11 having a convex surface on the object side, a biconvex positive lens element 12, a positive meniscus lens element 13 having a convex surface on the object side, and a biconcave negative lens element 14, in that order from the object side.

In each of the first through fourth and sixth numerical embodiments, the second lens group G2 is configured of a biconcave negative lens element 21, a biconvex positive lens element 22, a biconvex positive lens element 23, and a biconvex positive lens element 24, in that order from the object side. The surface on the image side of the biconcave negative lens element 21 is cemented to the surface on the object side the biconvex positive lens element 22 to form a cemented lens having a negative refractive power. Each of the biconvex positive lens element 22, the biconvex positive lens element 23 and a biconvex positive lens element 24 is formed from a low-dispersion glass ED lens having large positive anomalous dispersion characteristics.

In the fifth numerical embodiment, the second lens group G2 is configured of a biconcave negative lens element 21', a biconvex positive lens element 22', and a biconvex positive lens element 23', in that order from the object side. The surface on the image side of the biconcave negative lens element 21' is cemented to the surface on the object side of the biconvex positive lens element 22' to form a cemented lens having a negative refractive power. The biconvex positive lens element 22' is formed from a low-dispersion glass ED lens having large positive anomalous dispersion characteristics.

In each of the first through fourth and sixth numerical embodiments, the third lens group G3 is configured of a negative meniscus lens element 31 having a convex surface on the object side, and a positive meniscus lens element 32 having a convex surface on the object side, in that order from the object side.

In the fifth numerical embodiment, the third lens group G3 is configured of a negative meniscus lens element 31 having a convex surface on the object side, and a biconvex positive lens element 32, in that order from the object side.

In the fixed focal-length lens system of the present embodiments, the entire lens system is divided into the negative first lens group G1, the positive second lens group G2 and the positive third lens group G3; and the first lens group G1 and the second lens group G2 have been configured to have a retrofocus lens relationship. Furthermore, the fixed focal-length lens systems of the present embodiments are capable of macro photography and include an intermediate telephoto angle-of-view.

The first lens group G1 is configured of a negative lens element 11 having a concave surface on the image side, two positive lens elements 12 and 13, and a negative lens element 14 having a concave surface on the image side, in that order from the object side. Furthermore, the number of positive lens elements provided in the middle of the lens group is not limited to two; three or more positive lens elements can be provided therein. It is necessary to strengthen the positive refractive power of at least two of the lens elements (including the positive lens elements 12 and 13) that are provided in the middle of the lens group, in order to miniaturize the lens system, whereby spherical aberration, axial chromatic aberration, coma and astigmatism occur in large amounts. However, in the present embodiments, by providing the negative lens element 11, having a concave surface on the image side, on the object side of the at least two lens elements that are provided in the middle of the lens group (closest to the object side within the first lens group G1), spherical aberration, axial chromatic aberration, coma and astigmatism can be favorably corrected while suitably maintaining a backfocus. Furthermore, by providing the negative lens element (biconcave negative lens element) 14, having a concave surface on the image side, on the image side of the at least two lens elements that are provided in the middle of the lens group (closest to the image side within the first lens group G1), coma and astigmatism can be favorably corrected. By forming the positive lens element that is provided closest to the image side within the first lens group G1 (the positive lens element 13 in the present embodiments) to approach a concentric lens profile about the aperture diaphragm S, the change in incident angle on the lens elements from the axial light rays to the outermost peripheral abaxial light rays can be suppressed, and occurrence of astigmatism can be suppresses as much as possible.

The second lens group G2 is configured of a negative lens element 21 (21') having a concave surface on the object side, and at least two positive lens elements 22, 23 and 24 (22' and 23'), in that order from the object side. The negative lens element 21 (21') that is provided closest to the object side within the second lens group G2 and the positive lens element 22 (22') constitute a negative cemented lens. Astigmatism can be favorably corrected by forming the negative lens element 21 (21') of the cemented lens to have a profile having a concave surface on the object side. Furthermore, by forming the positive lens element 22 (22') of the cemented lens to have a profile having a convex surface on the object side, spherical aberration and coma can be favorably corrected. Furthermore, by providing at least one positive lens element 23 and 24 (23') on the image side of the cemented lens, axial chromatic aberration, spherical aberration and coma throughout the entire lens system can be favorably corrected. In the case where a glass material having a large Abbe number is selected for the positive lens element provided on the image side of the cemented lens in order to favorably correct chromatic aberration, the refractive index is lowered, and spherical aberration and coma tend to increase. Accordingly, by providing the two positive lens elements 23 and 24 on the image side of the cemented lens, as in the first through fourth and sixth numerical embodiments, spherical aberration and coma can be effectively suppressed. Furthermore, the number of positive lens elements on the image side of the cemented lens is not limited to one or two; it is also possible to provide three or more positive lens elements.

In each of the first through sixth numerical embodiments, in order to favorably correct various aberrations, the third lens group G3 is configured of two lens elements: the negative lens element 31 and the positive lens element 32. By forming the negative lens element 31 to have a profile having a convex surface on the object side, coma and astigmatism can be favorably corrected. By forming the positive lens element 32 to have a concave surface on the image side, spherical aberration and coma can be favorably corrected. Furthermore, there is freedom in the arrangement order of the negative lens element 31 and the positive lens element 32 within the third lens group G3; it is possible to reverse the positions thereof. In addition, it is possible to provide two or more negative lens elements and/or two or more positive lens elements within the third lens group G3.

The fixed focal-length lens system of the present embodiments employs a so-called "floating method" in which, during focusing from an object at infinity to an object at a close-up distance, the third lens group G3 remains stationary relative to the imaging plane I, and the first lens group G1 and the second lens group G2 move (advance) toward the object side. According to this configuration, miniaturization of the entire lens system including the lens barrel, and a superior optical quality can both be achieved. Furthermore, by also moving (advancing) the third lens group G3 toward the object side, during focusing from an object at infinity to an object at a close-up distance, in addition to the first lens group G1 and the second lens group G2, occurrence of astigmatism and field curvature can be suppressed, and fluctuations in aberrations from an infinite photographic position to a minimum photographic position can be reduced.

From the viewpoint of balancing out aberration corrections, there is no difference in having the position of the aperture diaphragm S provided between the second lens group G2 and the third lens group G3 (first, second and fourth through sixth numerical embodiments) from being provided between the first lens group G1 and the second lens group G2 (third numerical embodiment).

In the case where the aperture diaphragm S is provided at a fixed location between the second lens group G2 and the third lens group G3, and focusing is carried out using the first lens group G1 and the second lens group G2, the exit pupil does not change since the effective f-number at the minimum photographic position does not change (the effective f-number does not change in accordance with the photographic distance); hence, although spherical aberration and coma at the minimum photographic distance easily remain, in the case of a miniature optical system that has a small aperture, this arrangement is extremely advantageous with respect to a diffraction phenomenon in which the resolving power does not improve even if the aberrations are favorably corrected. Furthermore, even when the fixed focal-length lens system is applied to an interchangeable lens, in which a shutter unit is mounted within the lens body, that is typified by a non-reflex camera (mirrorless camera), since the shutter unit does not need to be moved with the focusing lens(es) during focusing, a compact mechanical system can be achieved.

In the case where the aperture diaphragm S is provided between the first lens group G1 and the second lens group G2, the aperture diaphragm S must also move during focusing, which although enlarges the lens barrel, this arrangement is advantageous for correcting spherical aberration and coma at the minimum photographic distance since the effective f-number becomes larger during focusing.

Condition (1) specifies the ratio of the focal length of the first lens group G1 to the focal length of the second lens group G2. By satisfying condition (1), the entire lens system can be made compact, and various aberrations such as spherical aberration and coma can be favorably corrected to thereby achieve a superior optical quality.

If the upper limit of condition (1) is exceeded, the negative refractive power of the first lens group G1 becomes too weak, so that the balance is lost between the aberrations that occur in the first lens group G1 and the aberrations that occur in the second lens group G2, which is provided with a strong positive refractive power in order to miniaturize the lens system, thereby worsening the aberrations that occur over the entire lens system. Furthermore, in order to correct aberrations, the number of lens elements are required to be increased, thereby enlarging the entire lens system.

If the lower limit of condition (1) is exceeded, the negative refractive power of the first lens group G1 becomes too strong, so that a strong refractive power arrangement is required within the first lens group G1 for miniaturization purposes, thereby increasing spherical aberration and coma. Furthermore, the overall degree of retrofocus becomes too strong, thereby enlarging the entire length of the lens system.

Condition (2) specifies the refractive index at the d-line of the negative lens element 21 (21') which is positioned closest to the object side within the second lens group G2. By satisfying condition (2), the Petzval sum can be favorably corrected while field curvature and astigmatism in particular can be favorably corrected at the minimum photographic distance, thereby achieving a superior optical quality.

If the upper limit of condition (2) is exceeded, the correction of the Petzval sum becomes insufficient, so that large amounts of field curvature and astigmatism occur, especially at the minimum photographic distance.

Condition (3) specifies the Abbe number at the d-line of the negative lens element 21 (21') which is positioned closest to the object side within the second lens group G2. By satisfying condition (3), axial chromatic aberration can be favorably corrected, thereby achieving a superior optical quality.

If the upper limit of condition (3) is exceeded, correction of axial chromatic aberration becomes insufficient, so that axial chromatic aberration increases, especially at the minimum photographic distance.

Condition (4) specifies the anomalous dispersion characteristics of the negative lens element 21 (21') which is positioned closest to the object side within the second lens group G2. By satisfying condition (4), even when a glass material having a large positive anomalous dispersion is used in the positive lens elements 22, 23 and 24 (23' and 24') within the second lens group G2, axial chromatic aberration is favorably corrected and a superior optical quality is achieved.

If the upper limit of condition (4) is exceeded, when a glass material having a large positive anomalous dispersion is used for the positive lens elements 22, 23 and 24 (23' and 24') within the second lens group G2, correction of axial chromatic aberration becomes insufficient.

Condition (5) specifies the Abbe number at the d-line of at least one of the positive lens elements 22, 23 and 24 (23' and 24') within the second lens group G2. Since the position of the light rays that pass through the second lens group G2 is high at both the infinite photographic distance and the minimum photographic distance, by including within the second lens group G2 a positive lens element that has a large color-correction effect and a large anomalous dispersion which satisfy condition (5), axial chromatic aberration and lateral chromatic aberration can be effectively corrected, thereby achieving a superior optical quality.

If a positive lens element that satisfies condition (5) is not included within the second lens group G2, correction of axial chromatic aberration and lateral chromatic aberration becomes insufficient.

Condition (6) specifies the refractive index at the d-line of at least one of the positive lens elements 12 and 13 provided within the first lens group G1. By including a positive lens element that satisfies condition (6) within the first lens group G1, spherical aberration, coma and the Petzval sum can be favorably corrected, and various aberrations can be favorably corrected, especially at the minimum photographic distance, thereby achieving a superior optical quality.

If a positive lens element that satisfies condition (6) is not included within the first lens group G1, correction of spherical aberration, coma and the Petzval sum becomes insufficient, so that various aberrations increase, especially at the minimum photographic distance.

Condition (7) specifies the Abbe number at the d-line of at least one of the positive lens elements 12 and 13 provided within the first lens group G1. By including a positive lens element that satisfies condition (7) within the first lens group G1, lateral chromatic aberration can be favorably corrected and a superior optical quality can be achieved.

If a positive lens element that satisfies condition (7) is not included within the first lens group G1, correction of lateral chromatic aberration becomes insufficient.

Condition (8) specifies the shaping factor of the negative lens element 11 that is positioned closest to the object side within the first lens group G1. By satisfying condition (8), the entire lens system can be made compact, and coma and lateral chromatic aberration can be favorably corrected, thereby achieving a superior optical quality.

If the upper limit of condition (8) is exceeded, the refractive power of the negative lens element 11 becomes too weak, so that the negative lens element 11 must be provided at a further forward position in order to obtain a sufficient diverging effect, and since the overall length of the lens system and the effective diameter increase, miniaturization cannot be achieved.

If the lower limit of condition (8) is exceeded, the refractive power of the negative lens element 11 becomes too strong, so that due to the light bundle dispersing by a great amount, coma and lateral chromatic aberration increase.

Condition (9) specifies the Abbe number at the d-line of the negative lens element 11 which is positioned closest to the object side within the first lens group G1. By satisfying condition (9), the overall lens system can be made compact and lateral chromatic aberration can be favorably corrected, thereby achieving a superior optical quality.

If the lower limit of condition (9) is exceeded, a large amount of lateral chromatic aberration occurs. Furthermore, in order to correct lateral chromatic aberration, the number of lens elements within the first lens group G1 would need to be increased, thereby enlarging the entire lens system.

Condition (10) specifies the anomalous dispersion characteristics of the negative lens element 14 that is provided closest to the image side within the first lens group G1. By satisfying condition (10), axial chromatic aberration can be favorably corrected to thereby achieve a superior optical quality.

If the upper limit of condition (10) is exceeded, correction of axial chromatic aberration becomes insufficient.

Embodiments

Specific numerical embodiments will be herein shown. In the various aberration diagrams, lateral aberration diagrams, and the tables, the d-line, g-line and C-line show aberrations at their respective wave-lengths; S designates the sagittal image, M designates the meridional image, FNO. designates the f-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index at the d-line, and v(d) designates the Abbe number with respect to the d-line. The unit used for lengths is defined in millimeters (mm). The values for the f-number, the focal length, magnification, the half angle-of-view, the image height, the backfocus, the overall length of the lens system, and the distance d between lenses which changes during focusing are shown in the following order: infinite photographic position, intermediate photographic position (finite photographic position), and minimum photographic position. An aspherical lens element is not used in any of the first through sixth numerical embodiments.

[Numerical Embodiment 1]

FIGS. 1 through 6D and Tables 1 and 2 show a first numerical embodiment of the fixed focal-length lens system according to the present invention. FIG. 1 shows the lens arrangement at the infinite photographic position, FIGS. 2A, 2B, 2C and 2D show various aberrations thereof, FIGS. 3A, 3B, 3C and 3D show the lateral aberrations thereof. FIG. 4 shows the lens arrangement at the minimum photographic position, FIGS. 5A, 5B, 5C and 5D show various aberrations thereof, and FIGS. 6A, 6B, 6C and 6D show the lateral aberrations thereof. Table 1 shows the lens surface data, and Table 2 shows various lens-system data.

The fixed focal-length lens system of the first numerical embodiment is configured of a negative first lens group G1, a positive second lens group G2, and a positive third lens group G3, in that order from the object side. The aperture diaphragm S is positioned in between the second lens group G2 and the third lens group G3. During focusing from an object at infinity to an object at a close-up distance, the first lens group G1 and the second lens group G2 move toward the object side, and the aperture diaphragm S remains stationary, with the third lens group G3, relative to the imaging plane I. An optical filter OP is provided between the third lens group G3 and the imaging plane I.

The first lens group G1 is configured of a negative meniscus lens element 11 having a convex surface on the object side, a biconvex positive lens element 12, a positive meniscus lens element 13 having a convex surface on the object side, and a biconcave negative lens element 14, in that order from the object side. The biconcave negative lens element 14 is formed from a glass material having negative anomalous dispersion characteristics by using, e.g., OHARA S-NBM51.

The second lens group G2 is configured of a biconcave negative lens element 21, a biconvex positive lens element 22, a biconvex positive lens element 23, and a biconvex positive lens element 24, in that order from the object side. The surface on the image side of the biconcave negative lens element 21 and the surface on the object of the biconvex positive lens element 22 are cemented to each other to form a cemented lens having a negative refractive power. The biconcave negative lens element 21 is formed from a glass material having negative anomalous dispersion characteristics by using, e.g., OHARA S-NBM51. Each of the biconvex positive lens element 22, the biconvex positive lens element 23 and the biconvex positive lens element 24 is formed from a low-dispersion glass ED lens having large positive anomalous dispersion characteristics.

The third lens group G3 is configured of a negative meniscus lens element 31 having a convex surface on the object side, and a positive meniscus lens element 32 having a convex surface on the object side, in that order from the object side.

TABLE 1

SURFACE DATA

| Surf. No. | r | d | N(d) | v d |
|---|---|---|---|---|
| 1 | 93.279 | 1.000 | 1.49700 | 81.6 |
| 2 | 12.089 | 5.404 | | |
| 3 | 19.009 | 3.287 | 1.72916 | 54.7 |
| 4 | −34.417 | 0.100 | | |
| 5 | 13.573 | 2.073 | 1.81600 | 46.6 |
| 6 | 19.915 | 1.786 | | |
| 7 | −52.240 | 1.000 | 1.61340 | 44.3 |
| 8 | 8.724 | 3.221 | | |
| 9 | −8.863 | 1.000 | 1.61340 | 44.3 |
| 10 | 24.506 | 2.789 | 1.49700 | 81.6 |
| 11 | −13.220 | 0.100 | | |
| 12 | 60.224 | 2.568 | 1.43875 | 95.0 |
| 13 | −13.295 | 0.100 | | |
| 14 | 32.652 | 2.485 | 1.43875 | 95.0 |
| 15 | −21.880 | d15 | | |
| 16(diaphragm) | ∞ | 2.200 | | |
| 17 | 51.961 | 1.000 | 1.65412 | 39.7 |
| 18 | 15.785 | 0.859 | | |
| 19 | 19.813 | 2.618 | 1.77250 | 49.6 |
| 20 | 348.818 | 13.259 | | |
| 21 | ∞ | 1.050 | 1.51633 | 64.1 |
| 22 | ∞ | — | | |

TABLE 2

VARIOUS LENS-SYSTEM DATA

|  | Infinite Photographic Position | Intermediate Photographic Position | Minimum Photographic Position |
|---|---|---|---|
| FNO. | 2.8 | 2.8 | 2.8 |
| f | 18.00 | 18.75 | 19.18 |
| Magnification | 0.000 | −0.217 | −0.333 |
| W | 15.8 | 13.0 | 11.6 |
| Y | 5.00 | 5.00 | 5.00 |
| fB | 1.00 | 1.00 | 1.00 |
| L | 50.70 | 55.89 | 58.67 |
| d15 | 1.800 | 6.991 | 9.766 |

[Numerical Embodiment 2]

Figure 2A:
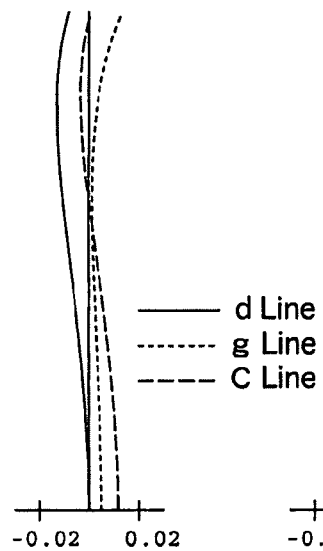
FIGS. 2A, 2B, 2C, and 2D show various aberrations that occurred in the arrangement of FIG. 1.
Figure 2B:
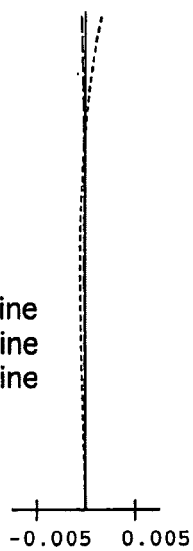
Figure 2C:
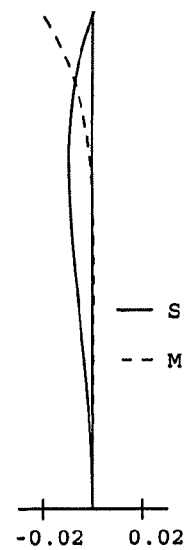
Figure 2D:
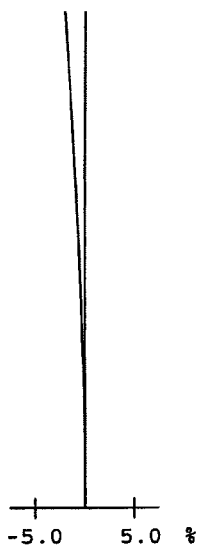
Figure 3A:
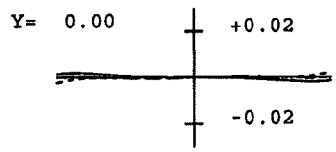
FIGS. 3A, 3B, 3C, and 3D show lateral aberrations that occurred in the arrangement of FIG. 1.
Figure 3B:
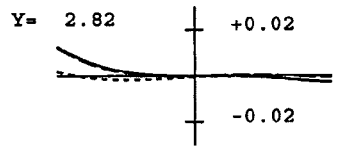
Figure 3C:
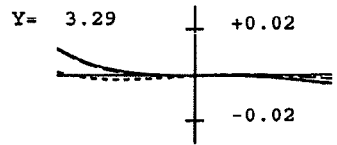
Figure 3D:
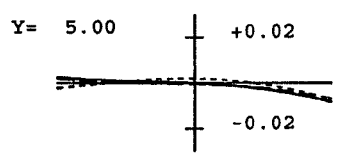
Figures 8A, 8B, 8C, 8D:
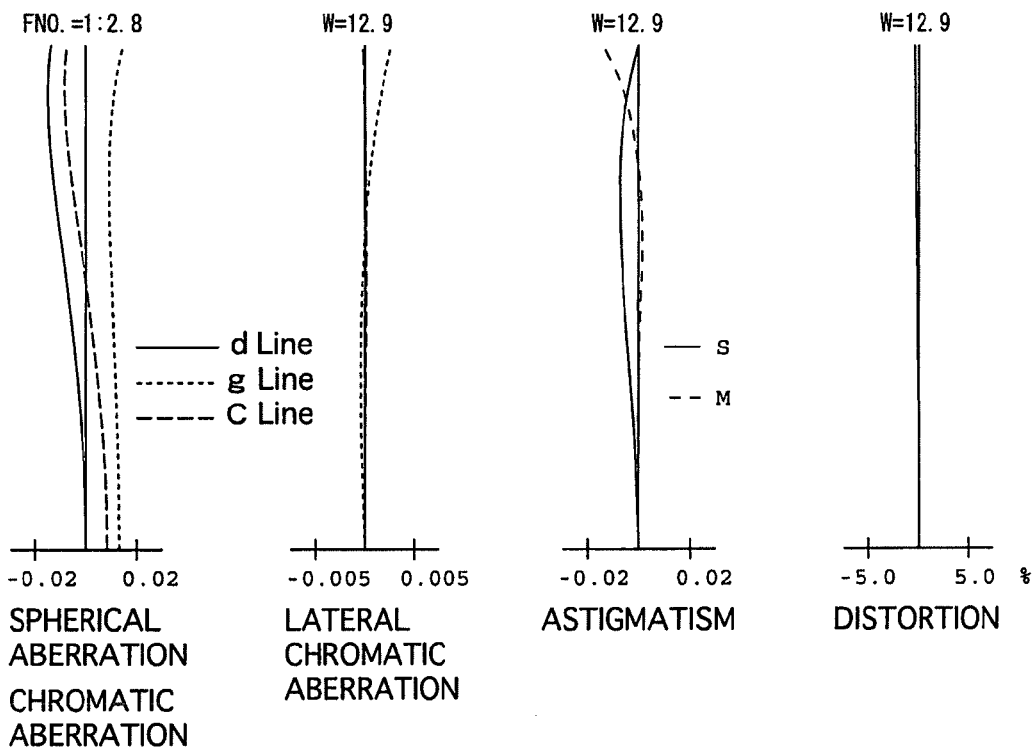
FIGS. 8A, 8B, 8C, and 8D show various aberrations that occurred in the arrangement of FIG. 7.
Figure 9A:
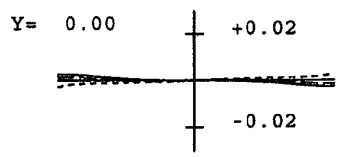
FIGS. 9A, 9B, 9C, and 9D show lateral aberrations that occurred in the arrangement of FIG. 7.
Figure 9B:
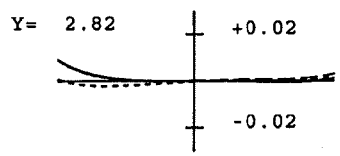
Figure 9C:
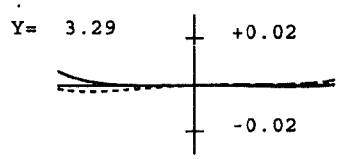
Figure 9D:
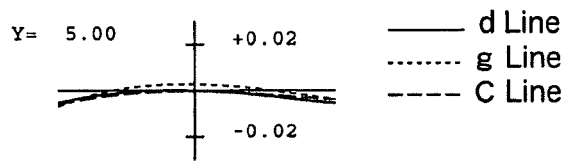
Figure 10:
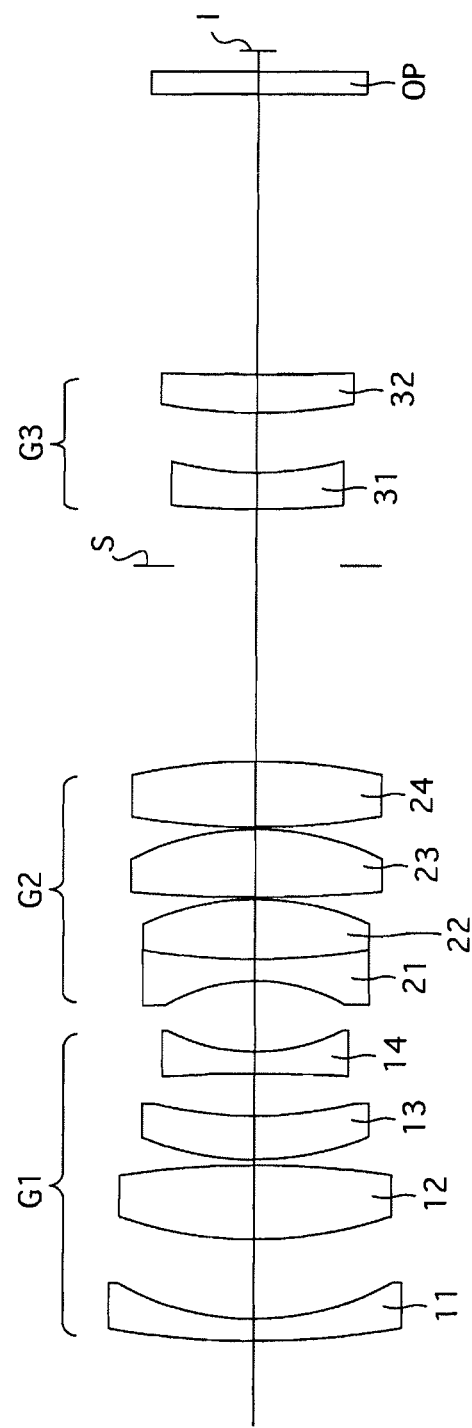
FIG. 10 shows a lens arrangement of a second numerical embodiment of a fixed focal-length lens system, according to the present invention, at a minimum photographic position.

FIGS. 7 through 12D and Tables 3 and 4 show a second numerical embodiment of the fixed focal-length lens system according to the present invention. FIG. 7 shows the lens arrangement at the infinite photographic position, FIGS. 8A, 8B, 8C and 8D show various aberrations thereof, FIGS. 9A, 9B, 9C and 9D show the lateral aberrations thereof, FIG. 10 shows the lens arrangement at the minimum photographic position, FIGS. 11A, 11B, 11C and 11D show various aberrations thereof, and FIGS. 12A, 12B, 12C and 12D show the lateral aberrations thereof. Table 3 shows the lens surface data, and Table 4 shows various lens-system data.

The lens arrangement of the second numerical embodiment is the same as that of the lens arrangement of the first numerical embodiment.

TABLE 3

SURFACE DATA

| Surf. No. | r | d | N(d) | ν d |
|---|---|---|---|---|
| 1 | 40.272 | 1.000 | 1.56384 | 60.7 |
| 2 | 13.043 | 3.631 | | |
| 3 | 19.288 | 3.399 | 1.77250 | 49.6 |
| 4 | −41.615 | 0.261 | | |
| 5 | 13.950 | 1.979 | 1.77250 | 49.6 |
| 6 | 18.983 | 1.917 | | |
| 7 | −74.991 | 1.000 | 1.61340 | 44.3 |
| 8 | 8.971 | 3.210 | | |
| 9 | −8.275 | 1.000 | 1.61340 | 44.3 |
| 10 | 32.585 | 2.721 | 1.49700 | 81.6 |
| 11 | −12.389 | 0.100 | | |
| 12 | 71.065 | 3.122 | 1.43875 | 95.0 |
| 13 | −12.682 | 0.100 | | |
| 14 | 34.209 | 3.012 | 1.49700 | 81.6 |
| 15 | −26.316 | d15 | | |
| 16(diaphragm) | ∞ | 2.586 | | |
| 17 | 47.168 | 1.662 | 1.65412 | 39.7 |
| 18 | 15.387 | 2.712 | | |
| 19 | 24.367 | 1.753 | 1.81600 | 46.6 |
| 20 | 184.031 | 12.780 | | |
| 21 | ∞ | 1.050 | 1.51633 | 64.1 |
| 22 | ∞ | — | | |

TABLE 4

VARIOUS LENS-SYSTEM DATA

|  | Infinite Photographic Position | Intermediate Photographic Position | Minimum Photographic Position |
|---|---|---|---|
| FNO. | 2.8 | 2.8 | 2.8 |
| f | 22.00 | 22.30 | 22.46 |
| Magnification | 0.000 | −0.217 | −0.333 |

TABLE 4-continued

VARIOUS LENS-SYSTEM DATA

|  | Infinite Photographic Position | Intermediate Photographic Position | Minimum Photographic Position |
|---|---|---|---|
| W | 12.9 | 10.8 | 9.8 |
| Y | 5.00 | 5.00 | 5.00 |
| fB | 1.00 | 1.00 | 1.00 |
| L | 51.80 | 56.44 | 58.92 |
| d15 | 1.800 | 6.445 | 8.929 |

[Numerical Embodiment 3]

Figure 13:
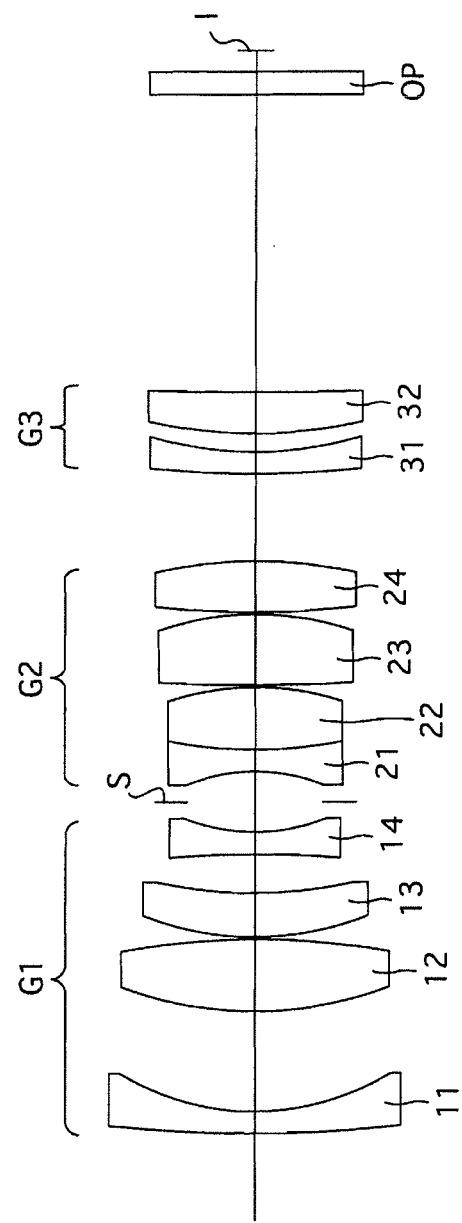
FIG. 13 shows a lens arrangement of a third numerical embodiment of a fixed focal-length lens system, according to the present invention, at an infinite photographic position.
Figures 14A, 14B, 14C, 14D:
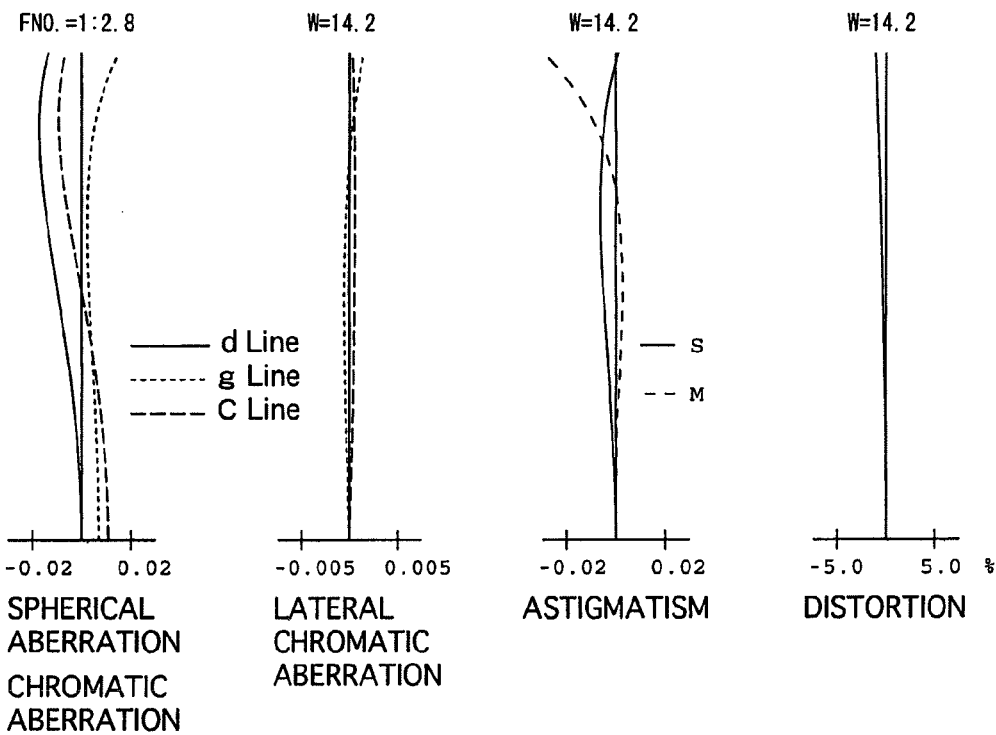
FIGS. 14A, 14B, 14C, and 14D show various aberrations that occurred in the arrangement of FIG. 13.
Figure 15A:
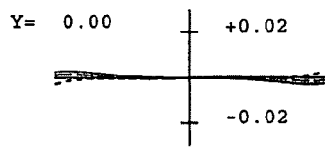
FIGS. 15A, 15B, 15C, and 15D show lateral aberrations that occurred in the arrangement of FIG. 13.
Figure 15B:
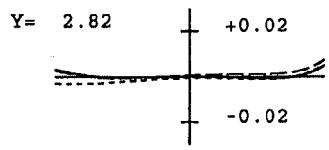
Figure 15C:
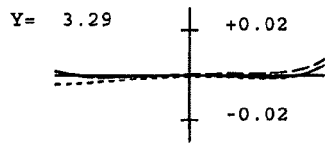
Figure 15D:
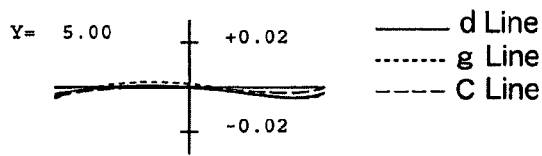
Figure 16:
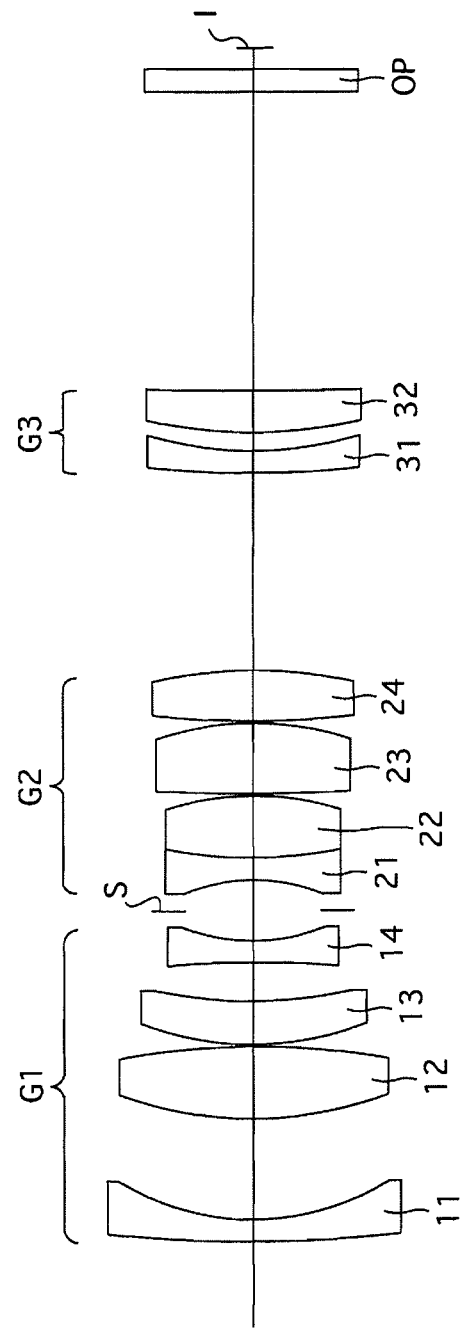
FIG. 16 shows a lens arrangement of a third numerical embodiment of a fixed focal-length lens system, according to the present invention, at a minimum photographic position.
Figures 17A, 17B, 17C, 17D:
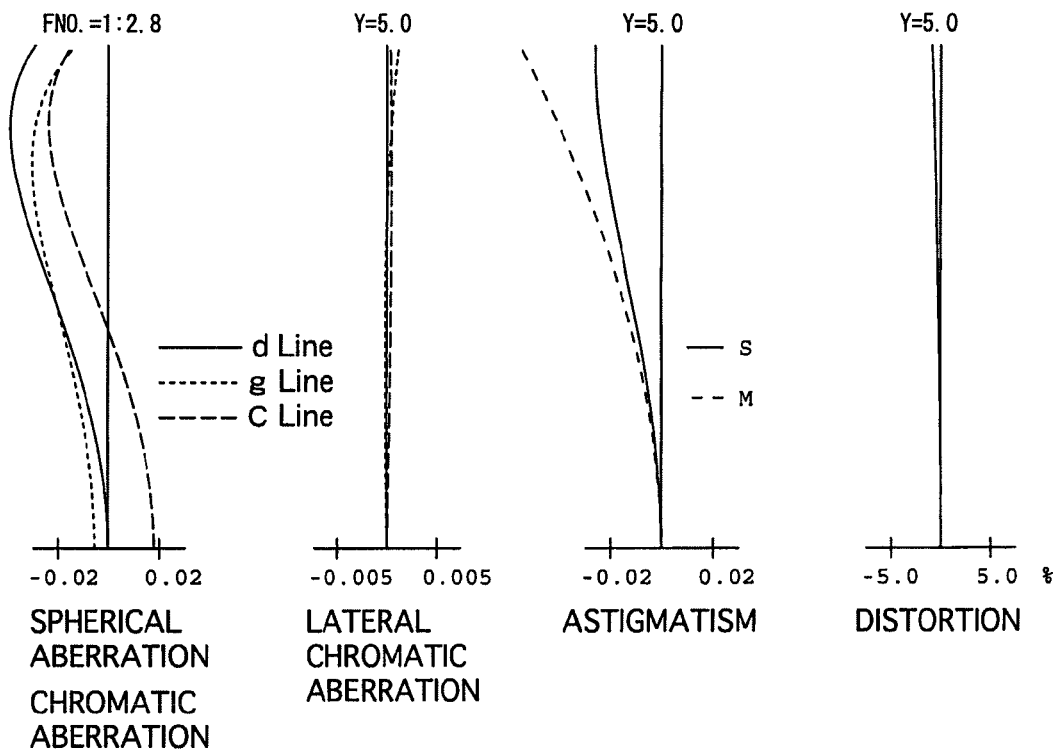
FIGS. 17A, 17B, 17C, show various aberrations that occurred in the arrangement of FIG. 16.
Figure 18A:
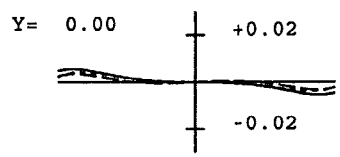
FIGS. 18A, 18B, 18C, and 18D show lateral aberrations that occurred in the arrangement of FIG. 16.
Figure 18B:
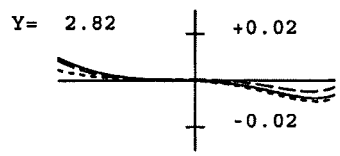
Figure 18C:
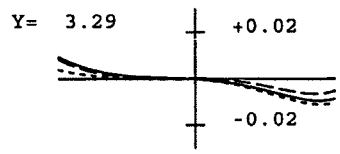
Figure 18D:
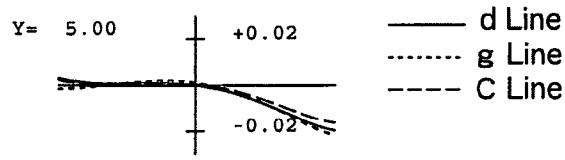

FIGS. 13 through 18D and Tables 5 and 6 show a third numerical embodiment of the fixed focal-length lens system according to the present invention. FIG. 13 shows the lens arrangement at the infinite photographic position, FIGS. 14A, 14B, 14C and 14D show various aberrations thereof, FIGS. 15A, 15B, 15C and 15D show the lateral aberrations thereof, FIG. 16 shows the lens arrangement at the minimum photographic position, FIGS. 17A, 17B, 17C and 17D show various aberrations thereof, and FIGS. 18A, 18B, 18C and 18D show the lateral aberrations thereof. Table 5 shows the lens surface data, and Table 6 shows various lens-system data.

The lens arrangement of the third numerical embodiment is the same as that of the lens arrangement of the first numerical embodiment except for the following point:

(1) The aperture diaphragm S is positioned in between the first lens group G1 and the second lens group G2, and the aperture diaphragm S moves with the first lens group G1 and the second lens group G2 toward the object side during focusing from an object at infinity to an object at a close-up distance.

TABLE 5

SURFACE DATA

| Surf. No. | r | d | N(d) | ν d |
|---|---|---|---|---|
| 1 | 63.562 | 1.000 | 1.48749 | 70.2 |
| 2 | 11.981 | 4.593 | | |
| 3 | 18.014 | 3.274 | 1.72916 | 54.7 |
| 4 | −34.660 | 0.100 | | |
| 5 | 14.376 | 1.995 | 1.81600 | 46.6 |
| 6 | 21.603 | 1.765 | | |
| 7 | −48.220 | 1.000 | 1.61340 | 44.3 |
| 8 | 9.158 | 1.361 | | |
| 9(diaphragm) | ∞ | 1.400 | | |
| 10 | −8.580 | 1.000 | 1.61340 | 44.3 |
| 11 | 21.064 | 2.832 | 1.49700 | 81.6 |
| 12 | −13.049 | 0.100 | | |
| 13 | 85.505 | 3.224 | 1.49700 | 81.6 |
| 14 | −13.990 | 0.100 | | |
| 15 | 42.887 | 2.310 | 1.43875 | 95.0 |
| 16 | −20.872 | d16 | | |
| 17 | 48.657 | 1.000 | 1.65412 | 39.7 |
| 18 | 16.978 | 0.854 | | |
| 19 | 22.498 | 1.886 | 1.74320 | 49.3 |
| 20 | 177.055 | 14.130 | | |
| 21 | ∞ | 1.050 | 1.51633 | 64.1 |
| 22 | ∞ | — | | |

TABLE 6

VARIOUS LENS-SYSTEM DATA

|  | Infinite Photographic Position | Intermediate Photographic Position | Minimum Photographic Position |
|---|---|---|---|
| FNO. | 2.8 | 3.1 | 3.2 |
| f | 20.00 | 20.29 | 20.43 |
| Magnification | 0.000 | −0.150 | −0.217 |
| W | 14.2 | 12.8 | 12.2 |
| Y | 5.00 | 5.00 | 5.00 |
| fB | 1.00 | 1.00 | 1.00 |
| L | 49.97 | 53.42 | 54.96 |
| d16 | 4.000 | 7.448 | 8.989 |

[Numerical Embodiment 4]

Figure 19:
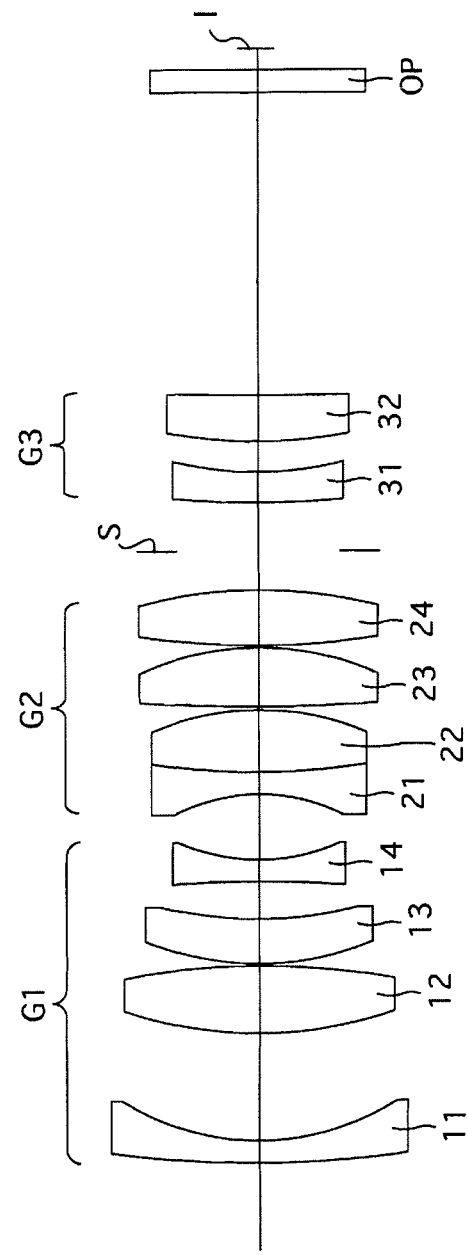
FIG. 19 shows a lens arrangement of a fourth numerical embodiment of a fixed focal-length lens system, according to the present invention, at an infinite photographic position.
Figure 22:
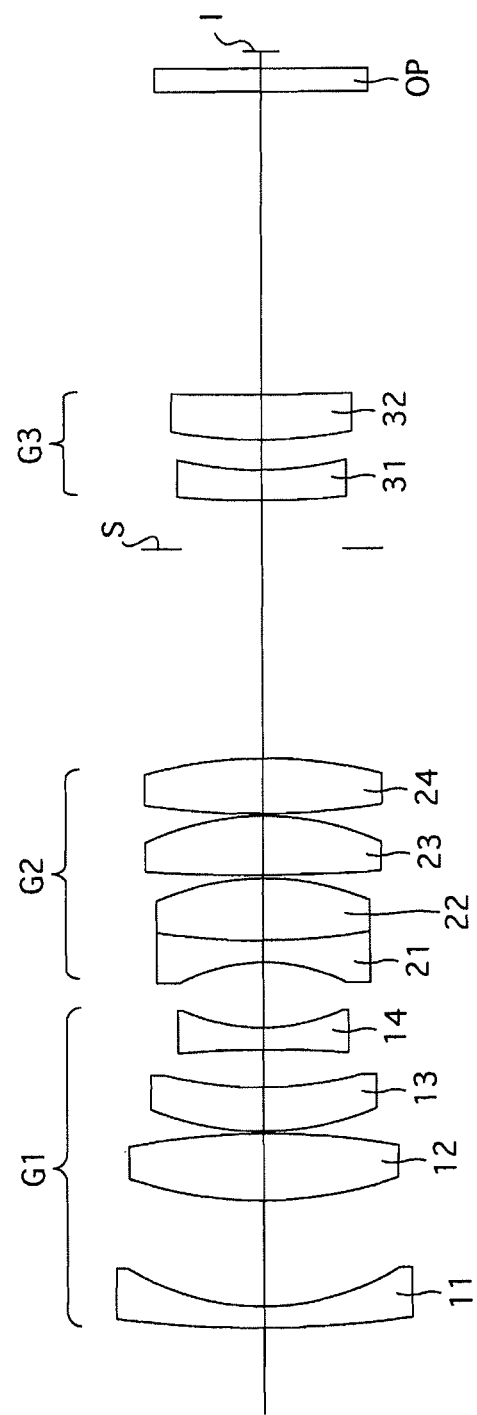
FIG. 22 shows a lens arrangement of a fourth numerical embodiment of a fixed focal-length lens system, according to the present invention, at a minimum photographic position.
Figures 23A, 23B, 23C, 23D:
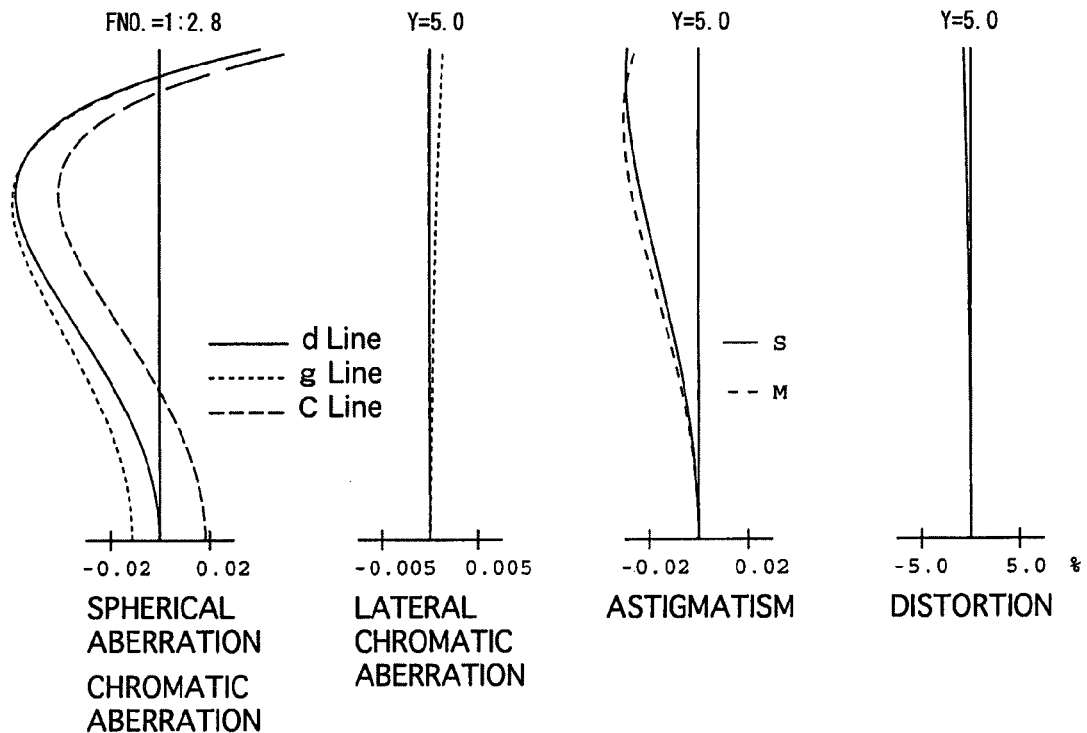
FIGS. 23A, 23B, 23C, and 23D shows various aberrations that occurred in the arrangement of FIG. 22.
Figure 24A:
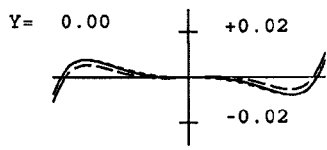
FIGS. 24A, 24B, 24C, and 24D show lateral aberrations that occurred in the arrangement of FIG. 22.
Figure 24B:
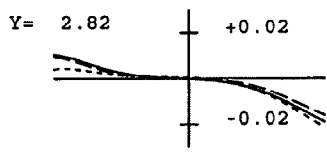
Figure 24C:
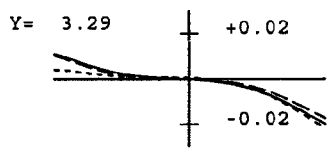
Figure 24D:
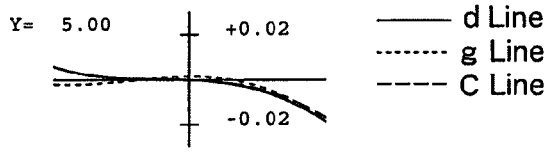

FIGS. 19 through 24D and Tables 7 and 8 show a fourth numerical embodiment of the fixed focal-length lens system according to the present invention. FIG. 19 shows the lens arrangement at the infinite photographic position, FIGS. 20A, 20B, 20C and 20D show various aberrations thereof, FIGS. 21A, 21B, 21C and 21D show the lateral aberrations thereof, FIG. 22 shows the lens arrangement at the minimum photographic position, FIGS. 23A, 23B, 23C and 23D show various aberrations thereof, and FIGS. 24A, 24B, 24C and 24D show the lateral aberrations thereof. Table 7 shows the lens surface data, and Table 8 shows various lens-system data.

The first lens group G1 is configured of a negative meniscus lens element 11 having a convex surface on the object side, a biconvex positive lens element 12, a positive meniscus lens element 13 having a convex surface on the object side, and a biconcave negative lens element 14, in that order from the object side. The biconcave negative lens element 14 is formed from a glass material having negative anomalous dispersion characteristics by using, e.g., HOYA E-ADF10.

The second lens group G2 is configured of a biconcave negative lens element 21, a biconvex positive lens element 22, a biconvex positive lens element 23, and a biconvex positive lens element 24, in that order from the object side. The surface on the image side of the biconcave negative lens element 21 and the surface on the object of the biconvex positive lens element 22 are cemented to each other to form a cemented lens having a negative refractive power. The biconcave negative lens element 21 is formed from a glass material having negative anomalous dispersion characteristics by using, e.g., HOYA E-ADF10. Each of the biconvex positive lens element 22, the biconvex positive lens element 23 and the biconvex positive lens element 24 is formed from a low-dispersion glass ED lens having large positive anomalous dispersion characteristics.

TABLE 7

SURFACE DATA

| Surf. No. | r | d | N(d) | ν d |
|---|---|---|---|---|
| 1 | 49.997 | 1.000 | 1.48749 | 70.2 |
| 2 | 11.790 | 4.904 |  |  |
| 3 | 19.484 | 3.061 | 1.74100 | 52.7 |
| 4 | −34.537 | 0.103 |  |  |
| 5 | 13.653 | 2.027 | 1.81600 | 46.6 |
| 6 | 18.584 | 1.711 |  |  |
| 7 | −54.876 | 1.000 | 1.61310 | 44.4 |
| 8 | 9.175 | 2.976 |  |  |
| 9 | −8.572 | 1.000 | 1.61310 | 44.4 |
| 10 | 32.812 | 2.821 | 1.49700 | 81.6 |

TABLE 7-continued

SURFACE DATA

| Surf. No. | r | d | N(d) | ν d |
|---|---|---|---|---|
| 11 | −12.593 | 0.153 |  |  |
| 12 | 84.638 | 2.688 | 1.43500 | 95.0 |
| 13 | −13.078 | 0.100 |  |  |
| 14 | 36.610 | 2.533 | 1.43875 | 95.0 |
| 15 | −21.582 | d15 |  |  |
| 16(diaphragm) | ∞ | 2.209 |  |  |
| 17 | 45.603 | 1.395 | 1.65412 | 39.7 |
| 18 | 16.441 | 1.385 |  |  |
| 19 | 22.314 | 2.090 | 1.77250 | 49.6 |
| 20 | 156.779 | 13.795 |  |  |
| 21 | ∞ | 1.050 | 1.51633 | 64.1 |
| 22 | ∞ | — |  |  |

TABLE 8

VARIOUS LENS-SYSTEM DATA

|  | Infinite Photographic Position | Intermediate Photographic Position | Minimum Photographic Position |
|---|---|---|---|
| FNO. | 2.8 | 2.8 | 2.8 |
| f | 20.00 | 20.53 | 20.82 |
| Magnification | 0.000 | −0.217 | −0.333 |
| W | 14.2 | 11.8 | 10.7 |
| Y | 5.00 | 5.00 | 5.00 |
| fB | 1.00 | 1.00 | 1.00 |
| L | 50.80 | 55.87 | 58.57 |
| d15 | 1.800 | 6.866 | 9.574 |

[Numerical Embodiment 5]

Figure 25:
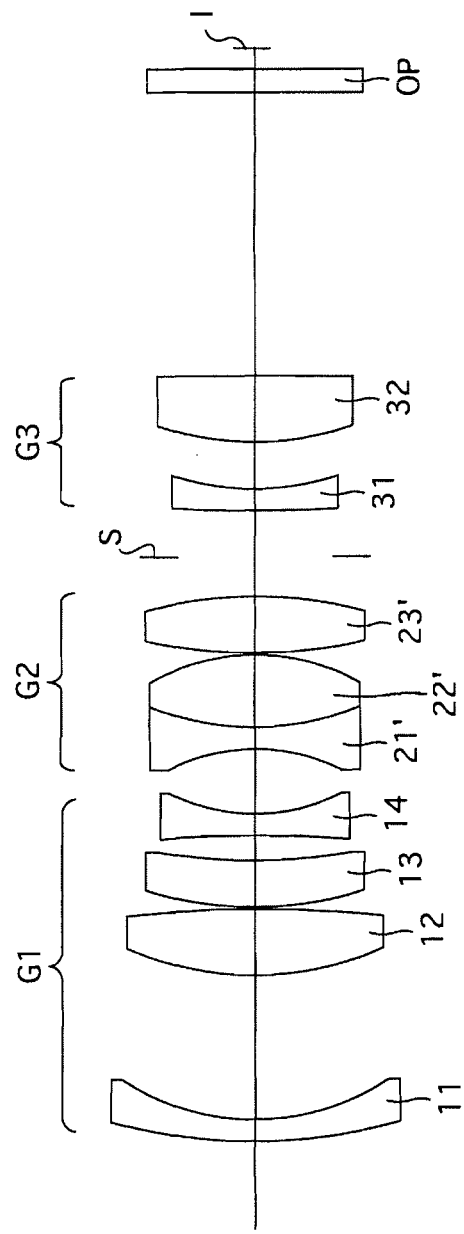
FIG. 25 shows a lens arrangement of a fifth numerical embodiment of a fixed focal-length lens system, according to the present invention, at an infinite photographic position.
Figure 28:
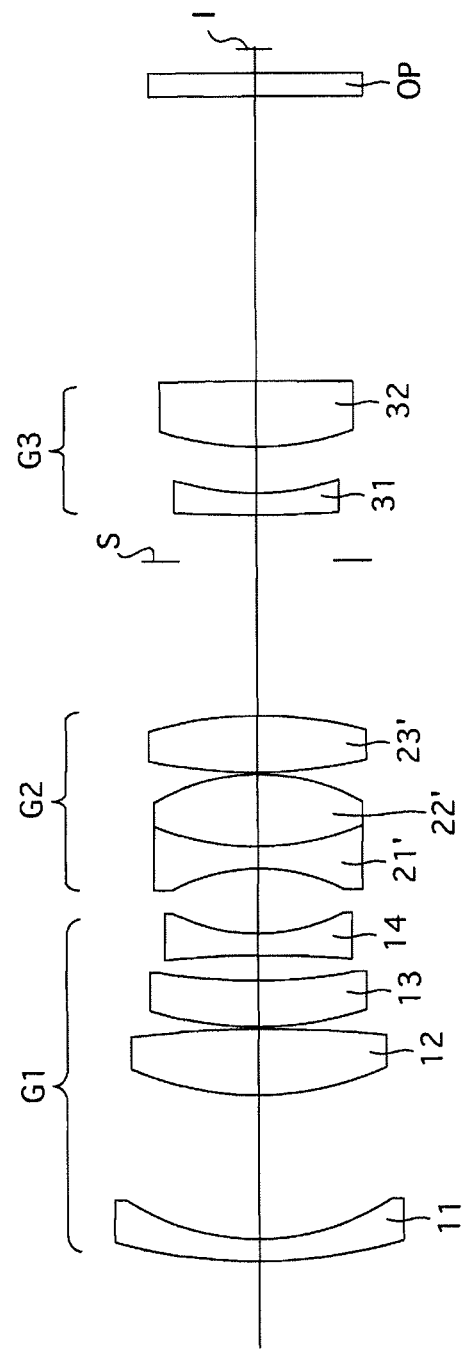
FIG. 28 shows a lens arrangement of a fifth numerical embodiment of a fixed focal-length lens system, according to the present invention, at a minimum photographic position.

FIGS. 25 through 30D and Tables 9 and 10 show a fifth numerical embodiment of the fixed focal-length lens system according to the present invention. FIG. 25 shows the lens arrangement at the infinite photographic position, FIGS. 26A, 26B, 26C and 26D show various aberrations thereof, FIGS. 27A, 27B, 27C and 27D show the lateral aberrations thereof, FIG. 28 shows the lens arrangement at the minimum photographic position, FIGS. 29A, 29B, 29C and 29D show various aberrations thereof, and FIGS. 30A, 30B, 30C and 30D show the lateral aberrations thereof. Table 9 shows the lens surface data, and Table 10 shows various lens-system data.

The lens arrangement of the fifth numerical embodiment is the same as that of the lens arrangement of the first numerical embodiment except for the following points:

(1) The second lens group G2 is configured of biconcave negative lens element 21', a biconvex positive lens element 22', and a biconvex positive lens element 23', in that order from the object side. The surface on the image side of the biconcave negative lens element 21' is cemented to the surface on the object side of the biconvex positive lens element 22' to form a cemented lens having a negative refractive power. The biconvex positive lens element 22' is formed from a low-dispersion glass ED lens having large positive anomalous dispersion characteristics.

(2) The positive lens element 32 of the third lens group G3 is a biconvex positive lens element instead of being a positive meniscus lens element having a convex surface on the object side.

TABLE 9

SURFACE DATA

| Surf. No. | r | d | N(d) | νd |
|---|---|---|---|---|
| 1 | 24.963 | 1.000 | 1.62041 | 60.3 |
| 2 | 11.203 | 6.606 | | |
| 3 | 14.561 | 3.018 | 1.77250 | 49.6 |
| 4 | −55.473 | 0.100 | | |
| 5 | 16.848 | 2.111 | 1.77250 | 49.6 |
| 6 | 26.541 | 1.142 | | |
| 7 | −53.663 | 1.000 | 1.61340 | 44.3 |
| 8 | 8.768 | 2.964 | | |
| 9 | −8.646 | 1.000 | 1.54814 | 45.8 |
| 10 | 12.764 | 3.301 | 1.43875 | 95.0 |
| 11 | −9.766 | 0.100 | | |
| 12 | 23.472 | 2.584 | 1.61800 | 63.4 |
| 13 | −19.071 | d13 | | |
| 14(diaphragm) | ∞ | 2.100 | | |
| 15 | 68.674 | 1.000 | 1.60342 | 38.0 |
| 16 | 12.356 | 2.132 | | |
| 17 | 13.953 | 3.008 | 1.62041 | 60.3 |
| 18 | −262.977 | 12.984 | | |
| 19 | ∞ | 1.050 | 1.51633 | 64.1 |
| 20 | ∞ | — | | |

TABLE 10

VARIOUS LENS-SYSTEM DATA

| | Infinite Photographic Position | Intermediate Photographic Position | Minimum Photographic Position |
|---|---|---|---|
| FNO. | 2.8 | 2.8 | 2.8 |
| f | 20.00 | 20.74 | 21.08 |
| Magnification | 0.000 | −0.150 | −0.217 |
| W | 14.3 | 12.5 | 11.7 |
| Y | 5.00 | 5.00 | 5.00 |
| fB | 1.00 | 1.00 | 1.00 |
| L | 50.00 | 53.65 | 55.28 |
| d13 | 1.800 | 5.449 | 7.079 |

[Numerical Embodiment 6]

Figure 31:
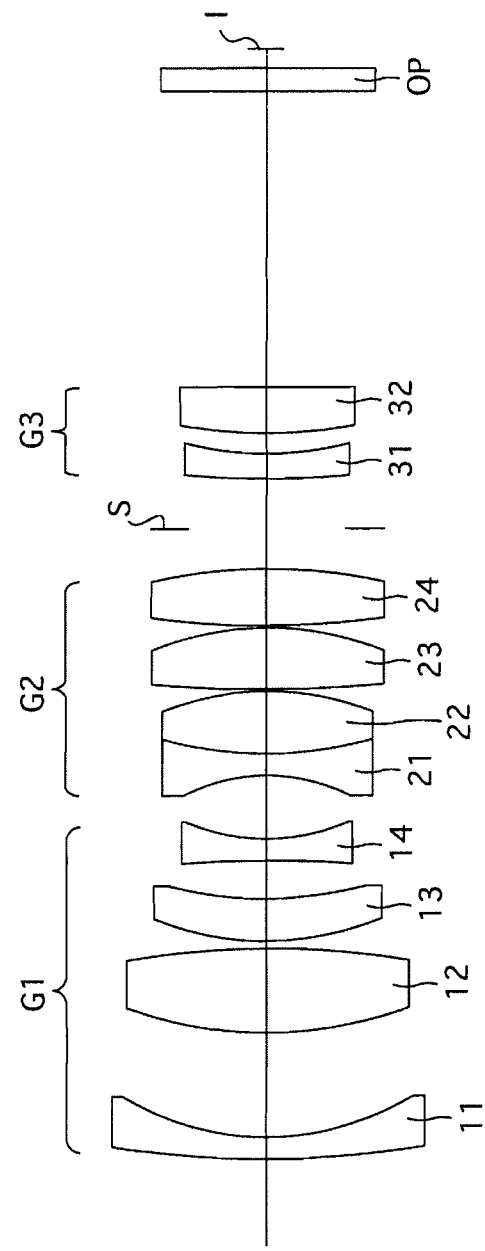
FIG. 31 shows a lens arrangement of a sixth numerical embodiment of a fixed focal-length lens system, according to the present invention, at an infinite photographic position.
Figures 35A, 35B, 35C, 35D:
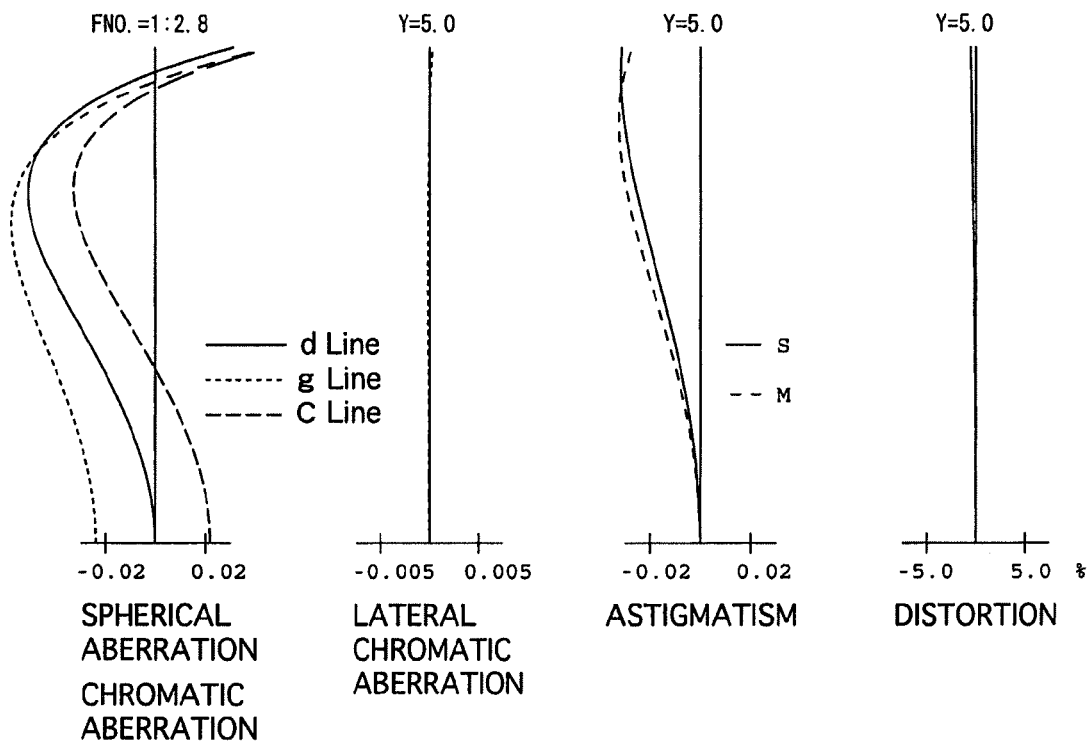
FIGS. 35A, 35B, 35C, and 35D show various aberrations that occurred in the arrangement of FIG. 34.
Figure 36A:
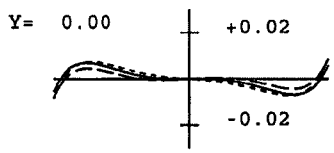
FIGS. 36A, 36B, 36C, and 36D shows lateral aberrations that occurred in the arrangement of FIG. 34.
Figure 36B:
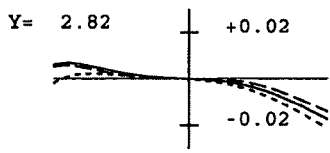
Figure 36C:
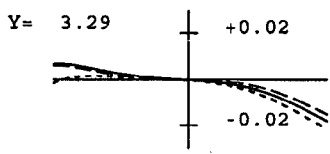
Figure 36D:
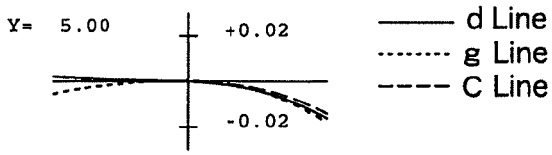

FIGS. 31 through 36D and Tables 11 and 12 show a sixth numerical embodiment of the fixed focal-length lens system according to the present invention. FIG. 31 shows the lens arrangement at the infinite photographic position, FIGS. 32A, 32B, 32C and 32D show various aberrations thereof, FIGS. 33A, 33B, 33C and 33D show the lateral aberrations thereof, FIG. 34 shows the lens arrangement at the minimum photographic position. FIGS. 35A, 35B, 35C and 35D show various aberrations thereof, and FIGS. 36A, 36B, 36C and 36D show the lateral aberrations thereof. Table 11 shows the lens surface data, and Table 12 shows various lens-system data.

The lens arrangement of the sixth numerical embodiment is the same as that of the lens arrangement of the fourth numerical embodiment.

TABLE 11

SURFACE DATA

| Surf. No. | r | d | N(d) | νd |
|---|---|---|---|---|
| 1 | 45.438 | 1.000 | 1.48749 | 70.2 |
| 2 | 12.873 | 4.776 | | |
| 3 | 19.323 | 3.835 | 1.74100 | 52.7 |
| 4 | −39.441 | 0.333 | | |
| 5 | 13.958 | 1.935 | 1.81600 | 46.6 |
| 6 | 18.048 | 1.749 | | |
| 7 | −48.952 | 1.000 | 1.61310 | 44.4 |

TABLE 11-continued

SURFACE DATA

| Surf. No. | r | d | N(d) | νd |
|---|---|---|---|---|
| 8 | 9.756 | 2.892 | | |
| 9 | −8.385 | 1.000 | 1.61310 | 44.4 |
| 10 | 18.153 | 2.833 | 1.49700 | 81.6 |
| 11 | −13.057 | 0.100 | | |
| 12 | 62.807 | 2.824 | 1.49700 | 81.6 |
| 13 | −14.128 | 0.100 | | |
| 14 | 41.312 | 2.595 | 1.49700 | 81.6 |
| 15 | −23.712 | d15 | | |
| 16(diaphragm) | ∞ | 2.277 | | |
| 17 | 45.872 | 1.140 | 1.65412 | 39.7 |
| 18 | 15.600 | 0.920 | | |
| 19 | 22.515 | 2.103 | 1.77250 | 49.6 |
| 20 | 332.369 | 13.539 | | |
| 21 | ∞ | 1.050 | 1.51633 | 64.1 |
| 22 | ∞ | — | | |

TABLE 12

VARIOUS LENS-SYSTEM DATA

| | Infinite Photographic Position | Intermediate Photographic Position | Minimum Photographic Position |
|---|---|---|---|
| FNO. | 2.8 | 2.8 | 2.8 |
| f | 20.00 | 20.50 | 20.78 |
| Magnification | 0.000 | −0.217 | −0.333 |
| W | 14.2 | 11.7 | 10.6 |
| Y | 5.00 | 5.00 | 5.00 |
| fB | 1.00 | 1.00 | 1.00 |
| L | 50.80 | 55.86 | 58.56 |
| d15 | 1.800 | 6.856 | 9.558 |

The values of each condition for each embodiment are shown in Table 13. The numerical values corresponding to condition (5) show values for the positive lens element that has the largest Abbe number at the d-line out of the positive lens elements 22, 23 and 24 (22' and 23') provided within the second lens group G2. The numerical values corresponding to condition (6) show values for the positive lens element that has the smallest refractive index at the d-line out of the positive lens elements 12 and 13 provided within the first lens group G1. The numerical values corresponding to condition (7) show values for the positive lens element that has the smallest Abbe number at the d-line out of the positive lens elements 12 and 13 provided within the first lens group G1.

TABLE 13

| | Embod. 1 | Embod. 2 | Embod. 3 |
|---|---|---|---|
| Cond. (1) | −0.21 | −0.14 | −0.12 |
| Cond. (2) | 1.61340 | 1.61340 | 1.61340 |
| Cond. (3) | 44.27 | 44.27 | 44.27 |
| Cond. (4) | −0.00650 | −0.00650 | −0.00650 |
| Cond. (5) | 94.94 | 94.94 | 94.94 |
| Cond. (6) | 1.72916 | 1.77250 | 1.72916 |
| Cond. (7) | 46.60 | 49.60 | 46.60 |
| Cond. (8) | 1.30 | 1.96 | 1.46 |
| Cond. (9) | 81.60 | 60.70 | 70.20 |
| Cond. (10) | −0.00650 | −0.00650 | −0.00650 |

| | Embod. 4 | Embod. 5 | Embod. 6 |
|---|---|---|---|
| Cond. (1) | −0.16 | −0.12 | −0.14 |
| Cond. (2) | 1.61310 | 1.54814 | 1.61310 |
| Cond. (3) | 44.36 | 45.78 | 44.36 |
| Cond. (4) | −0.00800 | 0.00120 | −0.00800 |

TABLE 13-continued

| Cond. (5) | 95.00 | 94.94 | 81.55 |
|---|---|---|---|
| Cond. (6) | 1.74100 | 1.77250 | 1.74100 |
| Cond. (7) | 46.60 | 49.60 | 46.60 |
| Cond. (8) | 1.62 | 2.63 | 1.79 |
| Cond. (9) | 70.20 | 60.30 | 70.20 |
| Cond. (10) | −0.00800 | −0.00650 | −0.00800 |

As can be understood from Table 13, the first through sixth numerical embodiments satisfy conditions (1) through (10). As can be understood from the various aberration diagrams, the various aberrations are relatively well corrected.

INDUSTRIAL APPLICABILITY

The fixed focal-length lens system of the present invention is ideal for use in a photographing apparatus such as a digital camera, etc., and is especially suitable for an interchangeable lens, in which a shutter unit is mounted within the lens body, that is typified by a non-reflex camera (mirrorless camera).

REFERENCE SIGNS LIST

G1 Negative first lens group
11 Negative lens element
12 Positive lens element
13 Positive lens element
14 Negative lens element
G2 Positive second lens group
21 Negative lens element
22 Positive lens element
23 Positive lens element
24 Positive lens element
21' Negative lens element
22' Positive lens element
23' Positive lens element
G3 Positive third lens group
31 Negative lens element
32 Positive lens element
S Aperture diaphragm
OP Optical filter
I Imaging plane

The invention claimed is:

1. A fixed focal-length lens system comprising a negative first lens group, a positive second lens group and a positive third lens group, in that order from the object side, wherein said first lens group and said second lens group move toward the object side during focusing from an object at infinity to an object at a close-up distance,
wherein said first lens group includes a negative lens element having a concave surface on the image side, at least two positive lens elements, and a negative lens element having a concave surface on the image side, in that order from a side closest to the object to a side closest to the image,
wherein said second lens group includes a negative lens element having a concave surface on the object side, and at least two positive lens elements, in that order from the object side,
wherein said third lens group includes at least one negative lens element, and at least one positive lens element, and
wherein the following condition (1) is satisfied:

$$-0.3 < fG2/fG1 < -0.05 \tag{1},$$

wherein fG1 designates the focal length of said first lens group, and fG2 designates the focal length of said second lens group.

2. The fixed focal-length lens system according to claim 1, wherein said second lens group comprises a negative cemented lens, and at least one positive lens element, in that order from the object side.

3. The fixed focal-length lens system according to claim 1, wherein said second lens group comprises a negative cemented lens, and at least two positive lens elements, in that order from the object side.

4. The fixed focal-length lens system according to claim 2, wherein the cemented lens that is provided within said second lens group comprises a negative lens element and a positive lens element, in that order from the object side.

5. The fixed focal-length lens system according to claim 1, wherein the following conditions (2) and (3) are satisfied:

$$nd(G2N) < 1.82 \tag{2},$$

and $$vd(G2N) < 50 \tag{3},$$

wherein nd(G2N) designates the refractive index at the d-line of the negative lens element that is provided closest to the object side within said second lens group, and vd(G2N) designates the Abbe number at the d-line of the negative lens element that is provided closest to the object side within said second lens group.

6. The fixed focal-length lens system according to claim 1, wherein the following condition (4) is satisfied:

$$\Delta Pg, F(G2N) < 0 \tag{4},$$

wherein

ΔPg, F(G2N) designates the anomalous dispersion of the negative lens element that is provided closest to the object side within said second lens group, wherein (A) ΔPg, F=0.002vd−0.6575+Pg,F: anomalous dispersion between the g-line and the F-line, and wherein (B) Pg, F=$(N_g-N_F)/(N_F-N_C)$: partial dispersion ratio between the g-line and the F-line.

7. The fixed focal-length lens system according to claim 1, wherein the following condition (5) is satisfied:

$$vd(G2P) > 80 \tag{5}$$

wherein vd(G2P) designates the Abbe number at the d-line of at least one positive lens element of the positive lens elements provided within said second lens group.

8. The fixed focal-length lens system according to claim 1, wherein said first lens group comprises a negative lens element having a concave surface on the image side, a positive lens element having a convex surface on the object side, a positive meniscus lens element having a concave surface on the image side, and a negative lens element having a concave surface on the image side, in that order from the object side.

9. The fixed focal-length lens system according to claim 1, wherein the following conditions (6) and (7) are satisfied:

$$nd(G1P) > 1.70 \tag{6},$$

and $$\nu d(G1P) > 45 \quad (7),$$

wherein nd(G1P) designates the refractive index at the d-line of at least one positive lens element of the positive lens elements provided within said first lens group, and vd(G1P) designates the Abbe number at the d-line of at least one positive lens element of the positive lens elements provided within said first lens group.

10. The fixed focal-length lens system according to claim 1, wherein the following conditions (8) and (9) are satisfied:

$$0.5 < SF(L1) < 3 \quad (8),$$

and $$\nu d(L1) > 50 \quad (9),$$

wherein

SF(L1) designates the shaping factor of the negative lens element provided closest to the object side within said first lens group, $$SF(L1) = (L1R1 + L1R2)/(L1R1 - L1R2),$$

L1R1 designates the radius of curvature of the surface on the object side of said negative lens element provided closest to the object side within said first lens group, L1R2 designates the radius of curvature of the surface on the image side of said negative lens element provided closest to the object side within said first lens group, and vd(L1) designates the Abbe number at the d-line of said negative lens element provided closest to the object side within said first lens group.

11. The fixed focal-length lens system according to claim 1, wherein the following condition (10) is satisfied:

$$\Delta Pg, F(G1N) < 0 \quad (10),$$

wherein

ΔPg, F(G1N) designates the anomalous dispersion of the negative lens element that is provided closest to the image side within said first lens group, wherein (A) ΔPg, F=0.002vd−0.6575+Pg,F: anomalous dispersion between the g-line and the F-line, and wherein (B) Pg, F=$(N_g-N_F)/(N_F-N_C)$: partial dispersion ratio between the g-line and the F-line.

12. The fixed focal-length lens system according to claim 1, wherein an aperture diaphragm is positioned between said second lens group and said third lens group, wherein said aperture diaphragm remains stationary, with said third lens group, relative to the imaging plane during focusing from an object at infinity to an object at a close-up distance.

13. The fixed focal-length lens system according to claim 1, wherein an aperture diaphragm is positioned between said first lens group and said second lens group, wherein said aperture diaphragm integrally moves toward the object side with said first lens group and said second lens group during focusing from an object at infinity to an object at a close-up distance.

14. A fixed focal-length lens system comprising a negative first lens group, a positive second lens group and a positive third lens group, in that order from the object side, wherein said first lens group includes four lens elements: a negative lens element, a positive lens element, a positive lens element and a negative lens element, in that order from the object side, wherein said second lens group includes three lens elements: a negative lens element, a positive lens element and a positive lens element, in that order from the object side; or four lens elements: a negative lens element, a positive lens element, a positive lens element and a positive lens element, in that order from the object side, wherein said third lens group includes two lens elements: a negative lens element and a positive lens element, in that order from the object side, wherein an aperture diaphragm is positioned between said second lens group and said third lens group, and wherein, during focusing from an object at infinity to an object at a close-up distance, said first lens group and said second lens group move toward the object side, and said aperture diaphragm remains stationary, with said third lens group, relative to the imaging plane.

15. The fixed focal-length lens system according to claim 3, wherein the cemented lens that is provided within said second lens group comprises a negative lens element and a positive lens element, in that order from the object side.

* * * * *